United States Patent
Hwang

(10) Patent No.: US 11,741,010 B2
(45) Date of Patent: Aug. 29, 2023

(54) STORAGE DEVICE STORING DATA IN ORDER BASED ON BARRIER COMMAND

(71) Applicant: SAMSUNG ELECTRONICS CO., LTD., Suwon-si (KR)

(72) Inventor: JooYoung Hwang, Suwon-si (KR)

(73) Assignee: SAMSUNG ELECTRONICS CO., LTD.

( * ) Notice: Subject to any disclaimer, the term of this patent is extended or adjusted under 35 U.S.C. 154(b) by 959 days.

(21) Appl. No.: 16/238,342

(22) Filed: Jan. 2, 2019

(65) Prior Publication Data

US 2019/0220404 A1    Jul. 18, 2019

Related U.S. Application Data

(60) Provisional application No. 62/616,718, filed on Jan. 12, 2018.

(30) Foreign Application Priority Data

Jun. 14, 2018 (KR) .................... 10-2018-0068127

(51) Int. Cl.
*G06F 12/0804* (2016.01)
*G06F 9/52* (2006.01)
(Continued)

(52) U.S. Cl.
CPC ........ *G06F 12/0804* (2013.01); *G06F 3/0619* (2013.01); *G06F 3/0656* (2013.01);
(Continued)

(58) Field of Classification Search
None
See application file for complete search history.

(56) References Cited

U.S. PATENT DOCUMENTS

| 5,930,807 A | 7/1999 | Ebrahim et al. |
| 7,457,921 B2 | 11/2008 | Gabryjelski et al. |

(Continued)

FOREIGN PATENT DOCUMENTS

| EP | 2015167 A2 | 1/2009 |
| JP | H02284246 A | 11/1990 |

(Continued)

OTHER PUBLICATIONS

Barrier Enabled IO Stack for Flash Storage Youjip Won et al Comments: 15 pages, 15 figures, 71 references Subjects: Operating Systems (cs.OS) Nov. 7, 2017 (Year: 2017).*

(Continued)

*Primary Examiner* — Rocio Del Mar Perez-Velez
*Assistant Examiner* — Marwan Ayash
(74) *Attorney, Agent, or Firm* — Fish & Richardson P.C.

(57) ABSTRACT

A method of programming data to a storage device including a nonvolatile memory device includes receiving first to third barrier commands from a host, receiving first to third data corresponding to the first to third barrier commands from the host, merging the first and second barrier commands and programming the first and second data to the nonvolatile memory device sequentially based on an order of the first and second barrier commands, verifying program completion of both the first and second data, mapping in mapping information of the first and second data when the programming of the first and second data is completed, and mapping out the information of both the first and second data when the programming of at least one of the first and second data is not complete, and programming the third data to the nonvolatile memory device after the mapping in or the mapping out.

16 Claims, 18 Drawing Sheets

(51) Int. Cl.
*G06F 3/06* (2006.01)
*G06F 16/906* (2019.01)
*G06F 12/02* (2006.01)
*G06F 12/06* (2006.01)

(52) U.S. Cl.
CPC .......... *G06F 3/0659* (2013.01); *G06F 3/0679* (2013.01); *G06F 9/522* (2013.01); *G06F 12/0253* (2013.01); *G06F 12/063* (2013.01); *G06F 16/906* (2019.01); *G06F 3/061* (2013.01)

(56) References Cited

U.S. PATENT DOCUMENTS

| | | | |
|---|---|---|---|
| 7,574,565 | B2 | 8/2009 | De Souza |
| 7,679,133 | B2 | 3/2010 | Son et al. |
| 8,006,047 | B2 | 8/2011 | De Souza et al. |
| 8,364,911 | B2 | 1/2013 | Shpeisman et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 9,146,857 | B2 | 9/2015 | Nan |
| 9,430,161 | B2 | 8/2016 | Yamazaki et al. |
| 9,632,711 | B1 | 4/2017 | Obr |
| 9,645,752 | B1 | 5/2017 | Obr |
| 9,830,983 | B1 | 11/2017 | Hara et al. |
| 9,990,146 | B2* | 6/2018 | Neelakanta ........... G06F 3/0659 |
| 2009/0006787 | A1 | 1/2009 | De Souza et al. |
| 2011/0233648 | A1 | 9/2011 | Seol et al. |
| 2012/0173800 | A1 | 7/2012 | Yoon et al. |
| 2012/0198214 | A1* | 8/2012 | Gadre .................... G06F 9/3851 712/225 |
| 2013/0166825 | A1* | 6/2013 | Kim .................... G06F 12/0246 711/E12.008 |
| 2014/0033209 | A1 | 1/2014 | Lih et al. |
| 2015/0220439 | A1 | 8/2015 | Mickens et al. |
| 2015/0370500 | A1 | 12/2015 | Cain, III et al. |
| 2016/0283137 | A1 | 9/2016 | Matsumura |
| 2017/0199817 | A1 | 7/2017 | Ishihara et al. |

FOREIGN PATENT DOCUMENTS

| | | |
|---|---|---|
| JP | 2001243021 A | 9/2001 |
| JP | 2014013367 A | 1/2014 |
| JP | 2014199583 A | 10/2014 |
| JP | 2016021246 A | 2/2016 |
| JP | 2016186735 A | 10/2016 |
| JP | 2017123110 A | 7/2017 |
| JP | 2018005959 A | 1/2018 |
| KR | 20130075135 | 7/2013 |

OTHER PUBLICATIONS

Barrier-Enabled IO Stack for Flash Storage Youjip Won, Hanyang University; Jaemin Jung, Texas A&M University; Gyeongyeol Choi, Joontaek Oh, and Seongbae Son, Hanyang University; Jooyoung Hwang and Sangyeun Cho, Samsung Electronics Feb. 12, 2018 (Year: 2018).*

Youjip Won et al., "Barrier-Enabled IO Stack for Flash Storage" pp. 1-14.

Sooman Jeong et al., "I/O Stack Optimization for Smartphones", 2013 USENIX Annual Technical Conference (USENIX ATC' 13) pp. 309-320.

Barrier Enabled 10 Stack for Flash Storage Youjip Won et al Comments: 15 pages, 15 figures, 71 references Subjects: Operating Systems (cs.OS) Nov. 7, 2017 (Year: 2017).

Joshi, Arpit et al., "Efficient Persist Barriers for Multicores", IEEE Xplore, pp. 660-671.

Japanese Examination Report dated Jan. 10, 2023 Cited From Corresponding Japanese Patent Application.

* cited by examiner

STORAGE DEVICE STORING DATA IN ORDER BASED ON BARRIER COMMAND

CROSS-REFERENCE TO RELATED APPLICATIONS

A claim for priority under 35 U.S.C. § 119 is made to U.S. provisional patent application No. 62/616,718 filed on Jan. 12, 2018 in the U.S. Patent and Trademark Office, and to Korean patent application No. 10-2018-0068127 filed on Jun. 14, 2018 in the Korean Intellectual Property Office, the entire content of which are hereby incorporated by reference.

BACKGROUND

The present disclosure herein relate to a storage device, and more particularly to a storage device that stores data in order based on a barrier command.

Data stored in a storage device that is a nonvolatile storage medium may be retained permanently or semi-permanently regardless of whether the storage device is powered. In general, such a storage device may first store data provided from a host to a buffer memory, and may then store the data from the buffer memory to the nonvolatile memory. However, an order of write requests by the host may not be guaranteed due to the above-described program operation whereby the data is first stored to the buffer memory before being stored to the nonvolatile memory.

To ensure a write order, the host may transfer data to the storage device, may wait until the transferred data are stored (or flushed) to the nonvolatile memory of the storage device, and then may transfer next data to the storage device. This operation may however degrade performance of the host. Accordingly, there is a need for a storage device which may guarantee the order of write requests without degradation of performance of the host.

SUMMARY

Embodiments of the inventive concepts provide a storage device that stores data in order based on a barrier command.

Embodiments of the inventive concepts provide a method for programming data to a storage device including a nonvolatile memory device that includes receiving, by the storage device, a first barrier command, a second barrier command, and a third barrier command from a host; receiving, by the storage device, first data corresponding to the first barrier command, second data corresponding to the second barrier command, and third data corresponding to the third barrier command from the host; merging, by the storage device, the first and second barrier commands and programming the first and second data to the nonvolatile memory device sequentially based on an order of the first and second barrier commands; verifying, by the storage device, program completion of both the first and second data; mapping in, by the storage device, mapping information of the first and second data to a mapping table of the storage device when the programming of the first and second data is completed, and mapping out the mapping information of both the first and second data when the programming of at least one of the first and second data is not completed; and programming, by the storage device, the third data to the nonvolatile memory device after the mapping in and the mapping out.

Embodiments of the inventive concepts further provide an operating method of a memory controller that controls a nonvolatile memory device that includes receiving, by the memory controller, a first barrier command and a first program command, a second barrier command and a second program command, and a third barrier command and a third program command from a host; receiving, by the memory controller, first data corresponding to the first barrier command, second data corresponding to the second barrier command, and third data corresponding to the third barrier command from the host; merging, by the memory controller, the first to third barrier commands and programming the first to third data sequentially to the nonvolatile memory device; and verifying, by the memory controller, whether the first to third data are programmed, classifying the first to third data as valid data when all the first to third data are programmed, and classifying the first to third data as invalid data when at least one of the first to third data are not programmed.

Embodiments of the inventive concepts still further provide a computer system that includes a host; and a storage device configured to receive from the host first, second and third barrier commands and first, second and third data which respectively correspond to the first, second and third barrier commands. The storage device includes a plurality of nonvolatile memory devices configured to store the first, second and third data; and a memory controller configured to control the plurality of nonvolatile memory devices, merge the first, second and third barrier commands, sequentially program the first, second and third data to the nonvolatile memory devices, determine whether the programming of the first, second and third data is completed, map in the first, second and third data to a mapping table of the storage device as valid data when the programming of all the first, second and third data is completed, and map out the first, second and third to the mapping table as invalid data when the programming of at least one of the first, second and third data is not completed.

BRIEF DESCRIPTION OF THE FIGURES

Embodiments of the inventive concepts will be more clearly understood from the following detailed description taken in conjunction with the accompanying figures.

DETAILED DESCRIPTION

Embodiments of the inventive concepts will be hereinafter described in detail and clearly to such an extent that one of ordinary skill in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
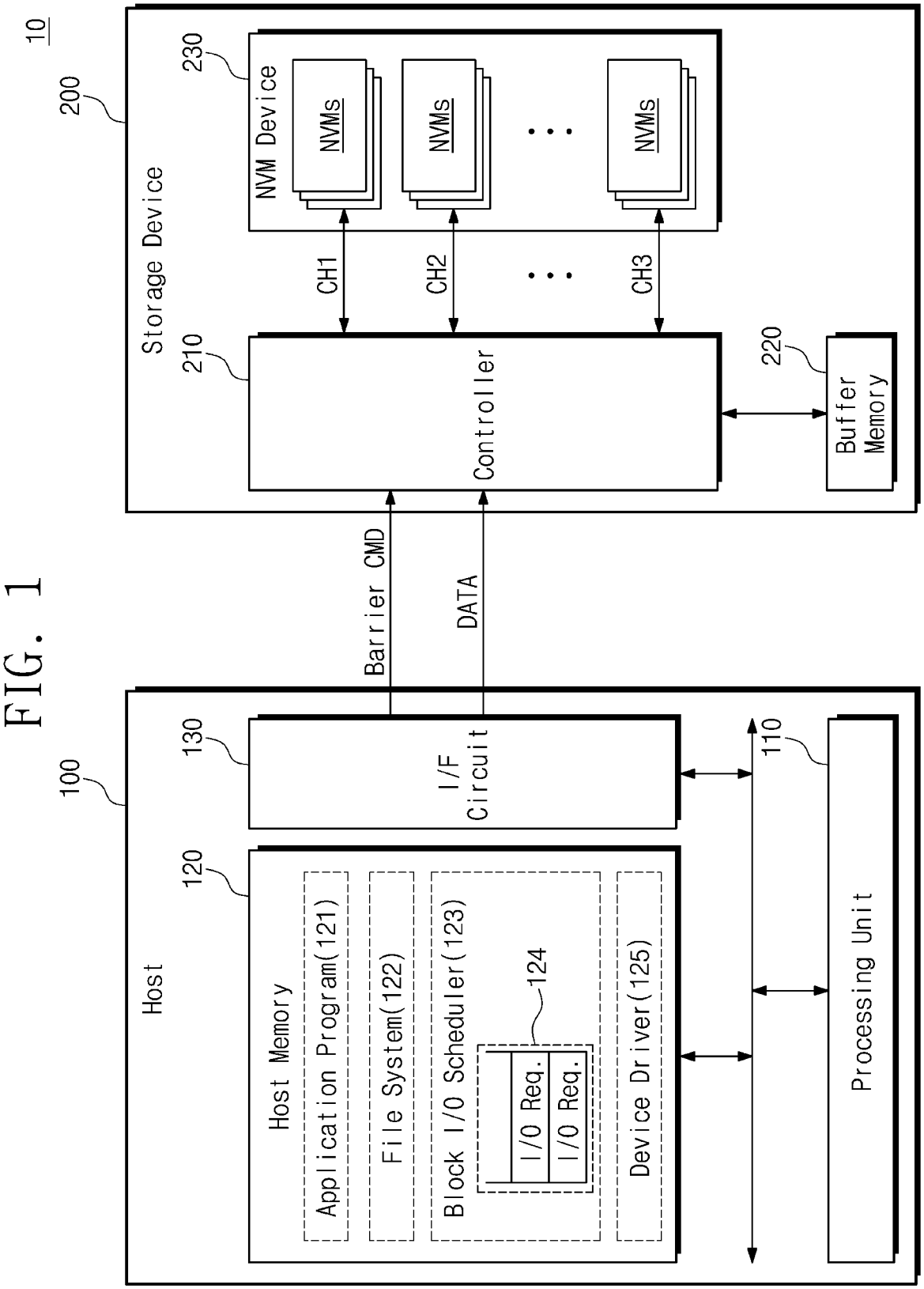
FIG. 1 illustrates a block diagram of a computer system according to an embodiment of the inventive concepts.

FIG. 1 illustrates a block diagram of a computer system according to an embodiment of the inventive concepts. Computer system 10 includes a host 100 and a storage device 200. The computer system 10 may be applied to or implemented within an electronic device such as for example a personal computer, a server, a workstation, a notebook, a tablet, a mobile device, a smartphone, or the like. The host 100 may transfer a barrier command and data to the storage device 200 (e.g., a solid state drive (SSD)). The storage device 200 may store the data based on the barrier command. The host 100 may issue the barrier command to inform a write order of data of the storage device 200, and the storage device 200 may follow or preserve the write order of data requested by the host 100 based on the barrier command. The host 100 includes a processing unit 110, a host memory 120, and an interface (I/F) circuit 130.

The processing unit 110 may execute software loaded onto the host memory 120. For example, the processing unit 110 may execute an application program, a file system, a block input/output scheduler, and a device driver. The processing unit 110 may include homogeneous multi-core processors or heterogeneous multi-core processors. For example, the processing unit 110 may include at least one of a central processing unit (CPU), an image signal processing unit (ISP), a digital signal processing unit (DSP), a graphics processing unit (GPU), a vision processing unit (VPU), and a neural processing unit (NPU).

An operating system OS which manages all hardware and software in the computer system 10 may be loaded onto the host memory 120. In detail, an application program 121 included in a user space, a file system 122 included in a kernel space, a block input/output (I/O) scheduler 123, and a device driver 125 may be loaded onto the host memory 120. The software layers 121 to 123 and 125 loaded onto the host memory 120 may be included in a software stack for accessing the storage device 200. The host memory 120 may include storage medium such as for example a dynamic random access memory (DRAM) device or a static random access memory (SRAM) device.

The application program 121 may be executed as a basic (or default) service or may be executed by (or responsive to) a request of a user. The user space where the application program 121 is stored and the kernel space where a kernel including the file system 122, the block I/O scheduler 123, the device driver 125, etc. are stored may be separated from each other. The application program 121 cannot directly access a resource such as the storage device 200. Instead, the application program 121 may call a function defined on a library (not illustrated) in which a system call function is included and may request a necessary task from the kernel. In the case where the system call function is called, a switch from a user mode to a kernel mode may be made.

The file system 122 may manage files or data stored to the storage device 200. For example, the file system 122 may include a FAT (file allocation table), an NTFS™ (new technology file system), an HFS (hierarchical file system), an HPFS (high performance file system), a UFS (unix file system), an ext2 (secondary extended file system), an ext3, an ext4, a JFS (journaling file system), an ISO 9660, Files-11, a VxFS (veritas file system), a ZFS™, a ReiserFS, a UDF (universal disk format), or the like. In particular, the file system 122 may perform journaling for preventing consistency of a database, a file, or data from not being maintained due to sudden power off (SPO) or system crash.

The block I/O scheduler 123 may be present in a block layer. The block I/O scheduler 123 may receive IO requests from the file system 122 and may store the received IO requests to a scheduler queue 124. The block I/O scheduler 123 may manage the scheduler queue 124. The block I/O scheduler 123 may merge the IO requests or may adjust the order of the IO requests (re-ordering). For example, the scheduler queue 124 may include a Noop scheduler, a Deadline scheduler, Anticipatory scheduler, a completely fair queuing (CFQ) scheduler, or the like.

The device driver 125 is a program which operates as a part of the kernel for controlling a hardware device such as the storage device 200. The device driver 125 may remove IO requests from the scheduler queue 124 and may generate a command for controlling the storage device 200. The device driver 125 may process the IO requests of the scheduler queue 124. For example, the device driver 125 may be a block device which performs data input/output on the storage device 200 by the block. In other embodiments, a program and a software layer loaded onto the host memory 120 are not limited to the example of FIG. 1.

The interface circuit 130 may provide physical connections between the host 100 and the storage device 200. For example, the interface circuit 130 may convert (or translate) commands, addresses, and data, which correspond to various IO requests generated from the host 100, in compliance with a scheme for communication with the storage device 200.

The host 100 may transfer the barrier command and data to the storage device 200. The host 100 may request the storage device 200 to write data in order by issuing the barrier command. The storage device 200 may receive the barrier command and data corresponding to the barrier command from the host 100. The storage device 200 includes a controller 210, a buffer memory 220, and a nonvolatile memory device 230.

The controller 210 (or a memory controller) may process a command received from the host 100. The controller 210 may control operations of the buffer memory 220 and the nonvolatile memory device 230. The controller 210 may store or buffer data received from the host 100 to the buffer memory 220, the data I/O speed of which is faster than that of the nonvolatile memory device 230, and then may write or program the data stored in the buffer memory 220 to the nonvolatile memory device 230.

In an embodiment, the controller 210 and the interface circuit 130 may communicate with each other based on one or more of various interface protocols such as for example universal serial bus (USB), small computer system interface (SCSI), peripheral component interconnect express (PCIe), nonvolatile memory express (NVMe), mobile PCIe (M-PCIe), advanced technology attachment (ATA), parallel ATA (PATA), serial ATA (SATA), serial attached SCSI (SAS), integrated drive electronics (IDE), universal flash storage (UFS), and Firewire™.

The buffer memory 220 may temporarily store data received from the host 100 or data received from the nonvolatile memory device 230. The buffer memory 220 may store a mapping table indicating a relationship between logical addresses LA (or logical block addresses LBA) of the host 100 and physical addresses PA (or physical block address PBA) of the nonvolatile memory device 230. The buffer memory 220 may be implemented by using a DRAM device or an SRAM device.

The nonvolatile memory device 230 may include nonvolatile memories communicating with the controller 210 through a first channel CH1, nonvolatile memories communicating with the controller 210 through a second channel CH2, and nonvolatile memories communicating with the controller 210 through a third channel CH3. The number of channels between the nonvolatile memory device 230 and the controller 210 is not limited to the example illustrated in FIG. 1. Each nonvolatile memory may include for example nonvolatile memory cells such as NAND flash memory cells, NOR flash memory cells, resistive random access memory (ReRAM) cells, ferroelectric random access memory (FRAM) cells, phase change random access memory (PRAM) cells, or magnetic random access memory (MRAM) cells. Hereinafter, description will be given under the assumption that each of the first to third nonvolatile memories includes NAND flash memory cells.

In an embodiment, the controller 210 may use the buffer memory 220 as cache memory. The controller 210 may store and merge data corresponding to a program unit of the nonvolatile memory device 230 to the buffer memory 220 and may program the merged data to the nonvolatile memory device 230 at the same time. The lifetime and performance of the nonvolatile memory device 230 can be improved by the above-described operation but a set of data may not be programmed to the nonvolatile memory device 230 in order of write commands received from the host 100. Here, the term "set of data" may be used to indicate a plural form of data respectively corresponding to the write commands, and the set of data may be referred to as "multi-data" or a "plurality of data". The host 100 may issue the barrier command so that a set of data is programmed to the nonvolatile memory device 230 in order based on a kind of data to be stored to the storage device 200 or the application program 121.

Figure 2:
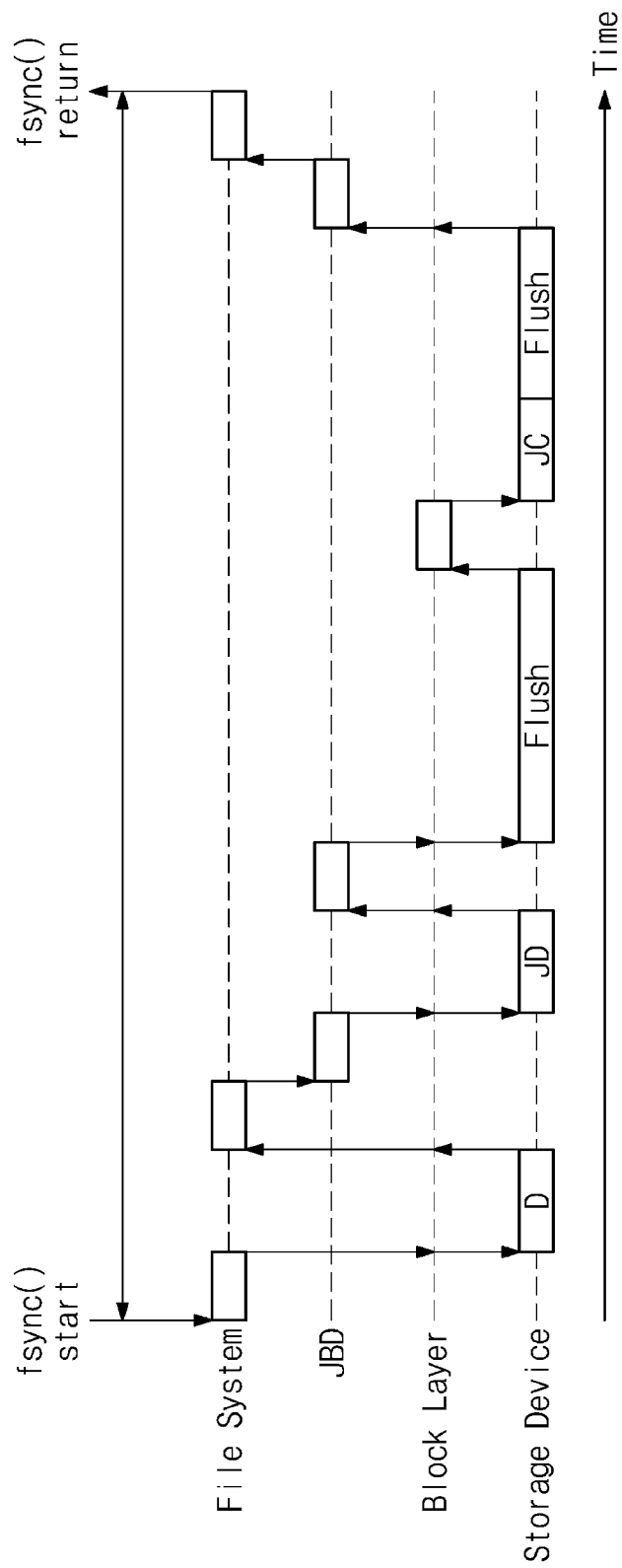
FIG. 2 illustrates a timing diagram of an operation in which a host of FIG. 1 performs journaling.

FIG. 2 illustrates a timing diagram of an operation in which a host of FIG. 1 performs journaling. FIG. 2 will be described with reference to FIG. 1. For example, an operating system (e.g., Android™ OS) loaded onto the host memory 120 may frequently generate a cache flush command. The operating system may generate the cache flush command for guaranteeing that data are actually programmed to the nonvolatile memory device 230, but may generate the cache flush command for guaranteeing the order in which a set of data are written to the nonvolatile memory device 230. As described above, the file system 122 may perform journaling. In the case where the host 100 modifies a part of a database file, the host 100 may back up original data to be modified to the journal, may modify the database file, and may delete the journal. The file system 122 may transfer the cache flush command to the storage device 200 for committing a journal transaction or maintaining the consistency of the database. The cache flush command may be for preserving a write order.

Referring to FIG. 2, a system call such as fsync( ) may be called when backing up the journal or after modifying a database file. In the case where fsync( ) begins, the file system 122 may insert (or enqueue) write requests into the scheduler queue 124 of the block layer for transferring file data "D" to the storage device 200. The write requests may be dispatched to the storage device 200. The file system 122 waits until the direct memory access (DMA) transfer of the file data "D" is completed. The DMA transfer may mean that a DMA controller (not illustrated) in the host 100, which is independent of the processing unit 110, directly exchanges data with the storage device 200. In the case where the DMA transfer of the file data "D" is completed, the file system 122 may trigger a journal block device (hereinafter referred to as a "JBD") for committing the journal transaction. The JBD may be a thread which is executed at a part of the host memory 120 which the file system 122 secures for the journaling.

The JBD may insert write requests into the scheduler queue 124 for transferring journal data JD to the storage device 200. The write requests may be dispatched to the storage device 200 by the device driver 125. The JBD waits until the DMA transfer of the journal data JD is completed. In the case where the DMA transfer of the journal data JD is completed, the file system 122 may insert flush requests into the scheduler queue 124 so that the journal data JD are flushed from the buffer memory 220 to the nonvolatile memory device 230. The flush requests may be dispatched to the storage device 200 by the device driver 125 (i.e., a transfer of the cache flush command) In the case where the flush of the journal data JD is completed, the write requests inserted into the scheduler queue 124 may be dispatched to the storage device 200. In the case where the DMA transfer of a journal commit JC is completed depending on the write requests and the journal commit JC is completely flushed, fsync( ) may be returned. Only after the journal commit JC is written to the nonvolatile memory device 230, the file system 122 may commit the journaling transaction. After the journaling transaction is committed, the file system 122 may perform another operation.

Referring to FIG. 2, to preserve a write order during execution of the journaling, the file system 122 has to wait until the DMA transfer of the file data "D", the DMA transfer and flush of the journal data JD, and the DMA transfer and flush of the journal commit JC are all completed. The journaling described with reference to FIG. 2 may neutralize parallel processing in the storage device 200 or may decrease a depth of a command queue of the controller 210. In particular, an operation of the host 100 may be delayed as much as a time needed for cell programming in the storage device 200. Accordingly, the host 100 may generate the barrier command instead of the cache flush command, for preserving a write order and reducing a delay due to the cache flush command. The host 100 may issue the barrier command instead of the cache flush command and may perform another operation without waiting until an operation of the storage device 200 corresponding to the barrier command is completed.

In an embodiment, the barrier command may be defined in the interface protocol between the host 100 and the storage device 200. The barrier command may occupy one entry of the above-described scheduler queue 124. In another embodiment, the host 100 may set the write command to the barrier command by setting a flag (e.g., REQ_BARRIER) of the write command. The storage device 200 may decode the flag of the write command and may determine whether the write command is the barrier command. The storage device 200 may store data corresponding to the barrier command in order. The barrier command may include a program command, that is, the write command.

An example in which fsync( ) is called is illustrated in FIG. 2, but fdatasync( ) may be called. fdatasync( ) is similar to fsync( ) File metadata may be modified by fsync( ). However, when fdatasync( ) is called, in the case where file metadata for reading newly written data are not additionally modified, the file metadata may not be modified.

Figure 3:
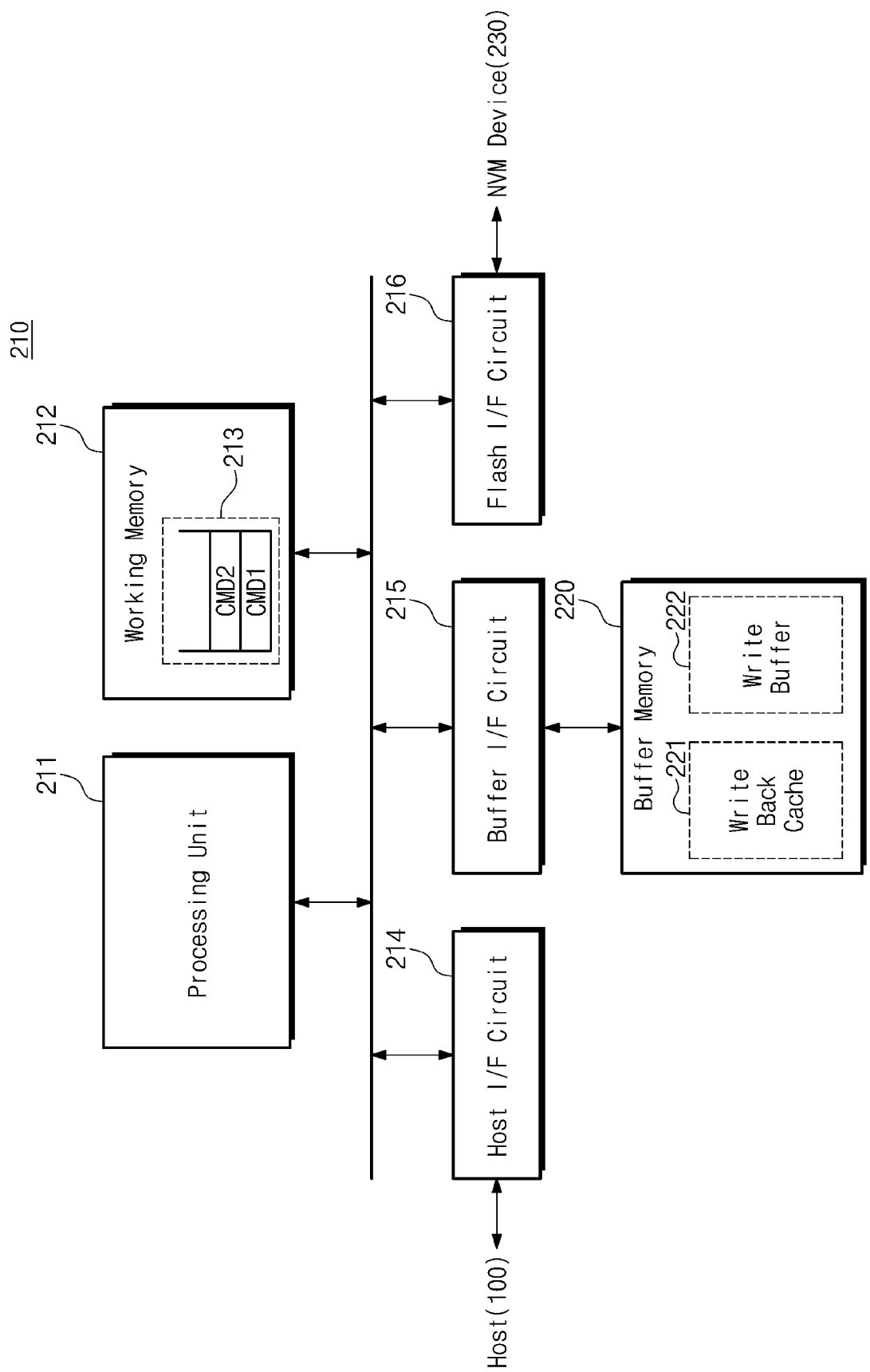
FIG. 3 illustrates a block diagram of a controller of FIG. 1.

FIG. 3 is a block diagram illustrating a controller of FIG. 1. FIG. 3 will be described with reference to FIG. 1. The controller 210 includes a processing unit 211, a working memory 212, a host interface (I/F) circuit 214, a buffer memory interface (I/F) circuit 215, and a flash interface circuit 216. The controller 210 may for example be implemented by using a system on chip (SoC), an application specific integrated circuit (ASIC), or a field programmable gate array (FPGA). The buffer memory 220 may be provided to be independent of the controller 210 as illustrated in FIG. 1 or may be included in the controller 210 as illustrated in FIG. 2.

The processing unit 211 may decode a command provided from the host 100. The processing unit 211 may control operations of the other components 212 to 216 of the controller 210 based on the command. The processing unit 211 may execute a flash translation layer (FTL) for performing garbage collection for managing the nonvolatile memory device 230, a mapping table indicating a relationship between logical addresses and physical addresses, wear leveling, or the like. The processing unit 211 may include at least one of the above-described processing units.

The working memory 212 may operate as a cache memory. The working memory 212 may store a decoding result of the processing unit 211. For example, a command queue 213 which stores commands CMD1 to CMD3 in order of the commands CMD1 to CMD3 transferred from the host 100 may be assigned to an area of the working memory 212. Here, the number of commands to be stored to the command queue 213 is not limited to an example illustrated in FIG. 3. Unlike illustration of FIG. 3, the command queue 213 may be placed in the processing unit 211 or in a partial area of the buffer memory 220.

The host interface circuit 214 may communicate with the host 100 in compliance with the above-described communication protocol. For example, the host interface circuit 214 may operate in compliance with an NVMe protocol. The processing unit 211 may receive commands through the host interface circuit 214 and may insert the received commands into the command queue 213 in order.

The buffer memory interface circuit 215 may control a read operation and a write operation of the buffer memory 220 under control of the processing unit 211. The buffer memory interface circuit 215 may provide the buffer memory 220 with the mapping table indicating the relationship between logical addresses and physical addresses. The buffer memory interface circuit 215 may provide data stored in the buffer memory 220 to the host interface circuit 214 or the flash interface circuit 216. The buffer memory interface circuit 215 may provide the buffer memory 220 with data provided from the host interface circuit 214 or the flash interface circuit 216.

The buffer memory 220 may include an area to which a write back cache 221 is assigned and an area to which a write buffer 222 is assigned. For example, in the case where the size of data which are provided from the host 100 and correspond to a command is smaller than the program unit of the nonvolatile memory device 230, the data may be stored to the write back cache 221. In the case where the size of data which are provided from the host 100 and correspond to a command is not smaller than the program unit of the nonvolatile memory device 230, the data may be stored to the write buffer 222.

The flash interface circuit 216 may exchange data with the nonvolatile memory device 230. The flash interface circuit 216 may write the data provided from the buffer memory 220 to the nonvolatile memory device 230 through the channels CH1 to CH3 of FIG. 1. The flash interface circuit 216 may receive data from the nonvolatile memory device 230 through the channels CH1 to CH3 and may provide the received data to the buffer memory 220. Hereinafter, various exemplifications in which the controller 210 processes the barrier command will be described.

Figure 4:
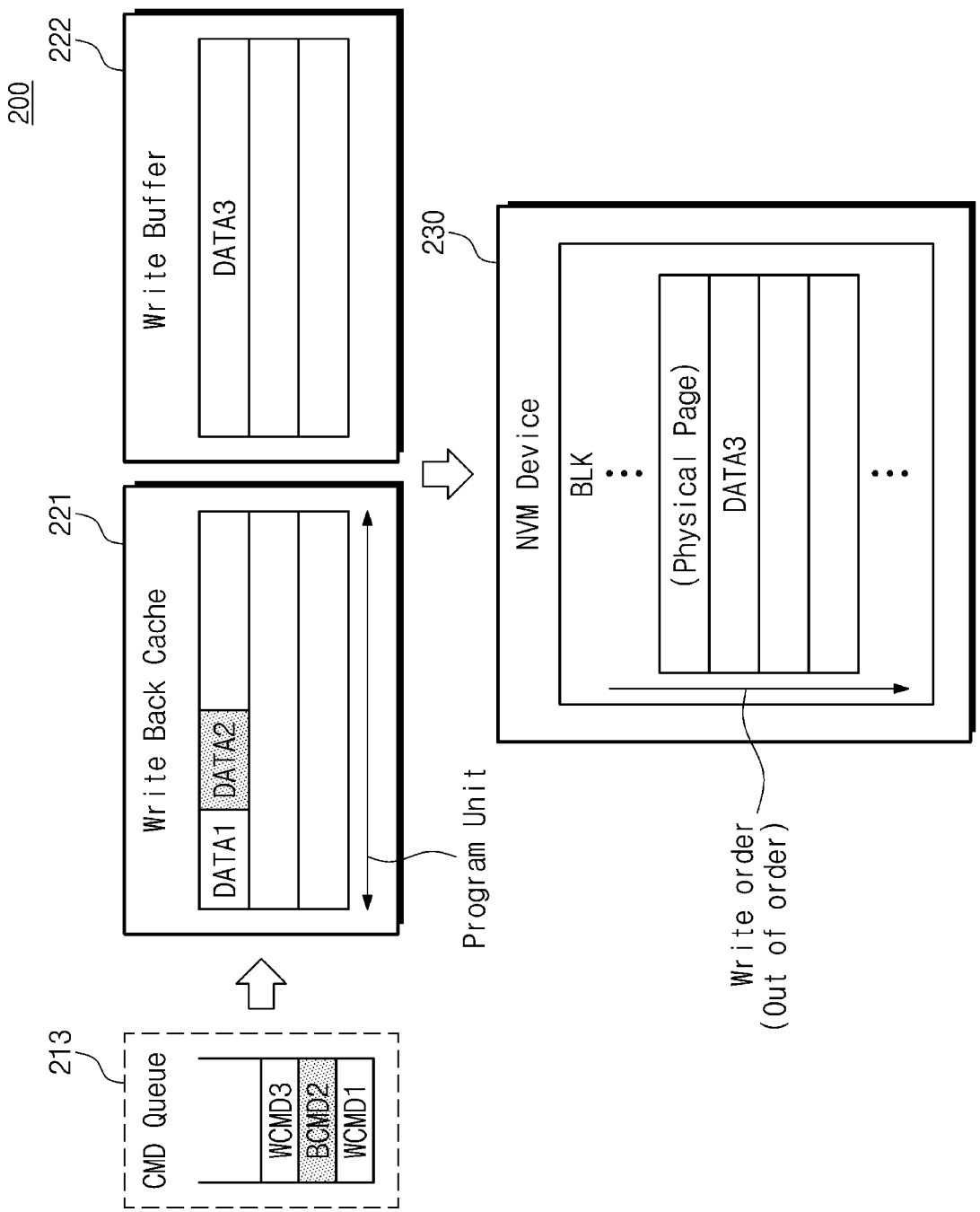
FIG. 4 illustrates a diagram of operations in which a storage device does not support a barrier command according to embodiments of the inventive concepts.
Figure 5:
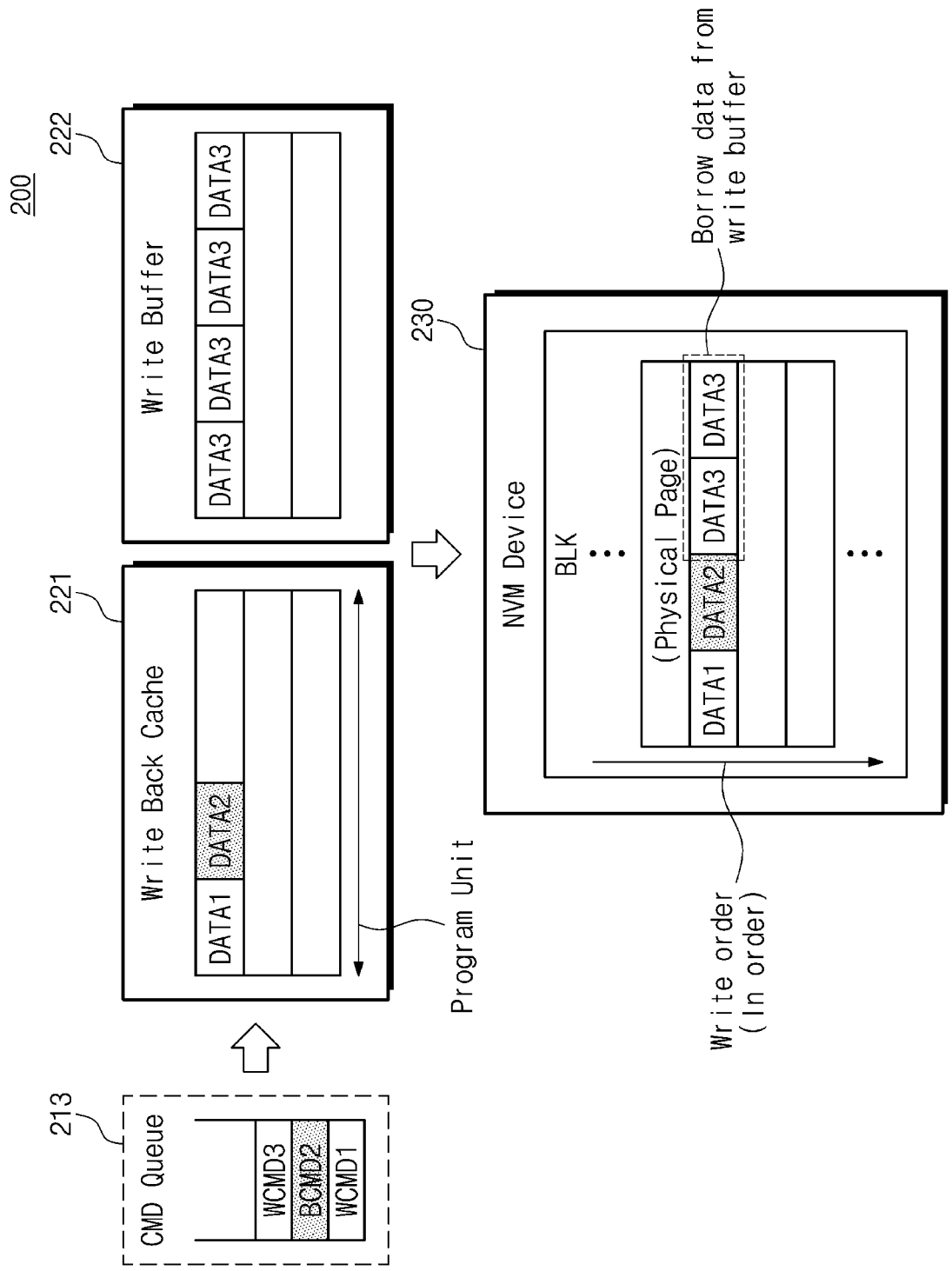
FIG. 5 illustrates a diagram of operations in which a storage device processes a barrier command, according to embodiments of the inventive concepts.

FIGS. 4 and 5 illustrate diagrams of operations in which a storage device processes a barrier command, according to embodiments of the inventive concepts. FIGS. 4 and 5 will be described together with reference to FIG. 1. The command queue 213, the write back cache 221, the write buffer 222, and the nonvolatile memory device 230 (refer to FIG.

1) of the storage device 200 are only illustrated for ease of description. The nonvolatile memory device 230 may include a plurality of blocks. However, only one block is illustrated in FIGS. 4 and 5. The block may include at least one or more physical pages. A physical page may include memory cells corresponding to a read unit or a write (or program) unit. The memory cells of the block may correspond to an erase unit.

The controller 210 of the storage device 200 may receive a first write command WCMD1, a second barrier command BCMD2, and a third write command WCMD3 in order, and the first write command WCMD1, the second barrier command BCMD2, and the third write command WCMD3 may be inserted into the command queue 213 in order. It is assumed that the storage device 200 of FIG. 4 does not support the second barrier command BCMD2, and the storage device 200 of FIG. 5 supports the second barrier command BCMD2 and preserves a write order. Also, it is assumed that each of the size of first data DATA1 corresponding to the first write command WCMD1 and the size of second data DATA2 corresponding to the second barrier command BCMD2 is 4 KB which is smaller than the program unit (e.g., 16 KB) of the nonvolatile memory device 230 and the size of third data DATA3 corresponding to the third write command WCMD3 is 16 KB which is identical to the program unit of the nonvolatile memory device 230. An example is illustrated in FIGS. 4 and 5 as the program unit of the nonvolatile memory device 230 is matched with the size of the physical page. In other embodiments, the program unit may be different from the size of the physical page.

For example, the controller 210 may simultaneously program a plurality of physical pages through a multi-channel, a multi-way, and a multi-plane in an interleaving scheme for reducing a program time of the nonvolatile memory device 230. That is, the program unit of the nonvolatile memory device 230 may be determined depending on the number of channels connecting the nonvolatile memory device 230 and the controller 210, the number of ways connected to each channel, the number of planes of a nonvolatile memory, the size of a physical page, and the number of bits which a memory cell stores.

The controller 210 may store the first data DATA1 and the second data DATA2, the size of which is smaller than the program unit, to the write back cache 221. For example, the controller 210 may merge a set of data, which are smaller than the program unit, to the write back cache 221 and may program the merged data corresponding to the program unit to the nonvolatile memory device 230. The write back cache 221 may be used to merge the set of data, the size of the data is smaller than the program unit. The controller 210 may store the third data DATA3 corresponding to the program unit to the write buffer 222. The write buffer 222 may be used to store data, the size of which is identical to the program unit or is greater than the program unit.

Referring to FIG. 4, before another data are merged into the first data DATA1 and the second data DATA2, each of which does not correspond to the program unit, the third data DATA3 corresponding to the program unit may be programmed to the nonvolatile memory device 230 prior to the second data DATA2. In the case where the third data DATA3 are programmed and then a SPO (i.e., sudden power off) or a system crash happens, the first data DATA1 and the second data DATA2 which have been stored in the write back cache 221 may be lost. The controller 210 of FIG. 4 cannot program the first data DATA1, the second data DATA2, and the third data DATA3 in order depending on the second barrier command BCMD2.

In contrast, the controller 210 of FIG. 5 may decode the second barrier command BCMD2 and may program the first data DATA1, the second data DATA2, and the third data DATA3 in order. The controller 210 may merge the first data DATA1, the second data DATA2, and a part (e.g., 8 KB) of the third data DATA3 and may program the merged data to the nonvolatile memory device 230. Here, the size of the merged data may correspond to the program unit. Even though the size of the second data DATA2 corresponding to the second barrier command BCMD2 is smaller than the program unit, the controller 210 may borrow any other data from the write back cache 221 or the write buffer 222, may merge the borrowed data and the second data DATA2, and may program the merged data corresponding to the program unit to the nonvolatile memory device 230. That is, the controller 210 may preserve the write order of the second data DATA2 based on the second barrier command BCMD2.

Figure 6:
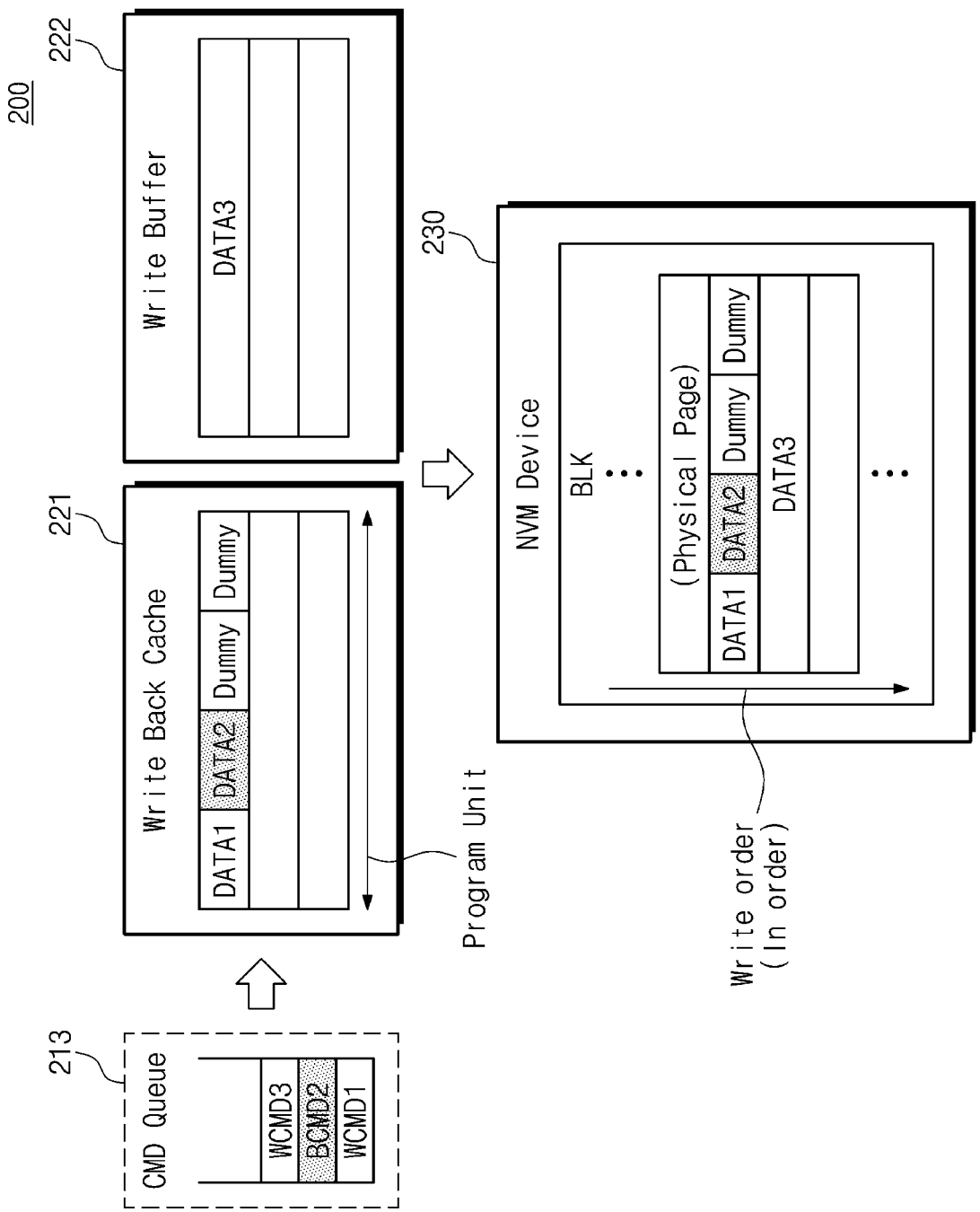
FIG. 6 illustrates a diagram of an operation in which a storage device processes a barrier command, according to another embodiment of the inventive concepts.

FIG. 6 illustrates a diagram of an operation in which a storage device processes a barrier command, according to another embodiment of the inventive concepts. FIG. 6 will be described together with reference to FIGS. 1 and 5. The assumption described with reference to FIGS. 4 and 5 may also be applied to FIG. 6, and it is assumed that the storage device 200 of FIG. 6 supports the second barrier command BCMD2 and preserves a write order.

Returning to FIG. 5 again, in the case where the controller 210 merges a part of the third data DATA3 with the second data DATA2, the rest of the third data DATA3 may be programmed to another physical page. Even though the size of the third data DATA3 corresponds to the program unit, the third data DATA3 may be divided into different pages and may be programmed to the different pages. In this case, to read all the third data DATA3, the nonvolatile memory device 230 must activate at least two physical pages in which the third data DATA3 are stored.

Referring to FIG. 6, the controller 210 may merge the first data DATA1 and the second data DATA2 with dummy data instead of the third data DATA3. The controller 210 may adjust the size of the second data DATA2 corresponding to the second barrier command BCMD2 to the program unit by using the dummy data. The controller 210 may merge the first data DATA1, the second data DATA2, and the dummy data, may program the merged data corresponding to the program unit to a physical page of the nonvolatile memory device 230, and then may program the third data DATA3 to another physical page of the nonvolatile memory device 230. Here, a position of the physical page in which the second data DATA2 are programmed and a position of the physical page in which the third data DATA3 are programmed may be adjacent to each other or may be distant from each other. The controller 210 may preserve the write order of the second data DATA2 based on the second barrier command BCMD2.

Figure 7:
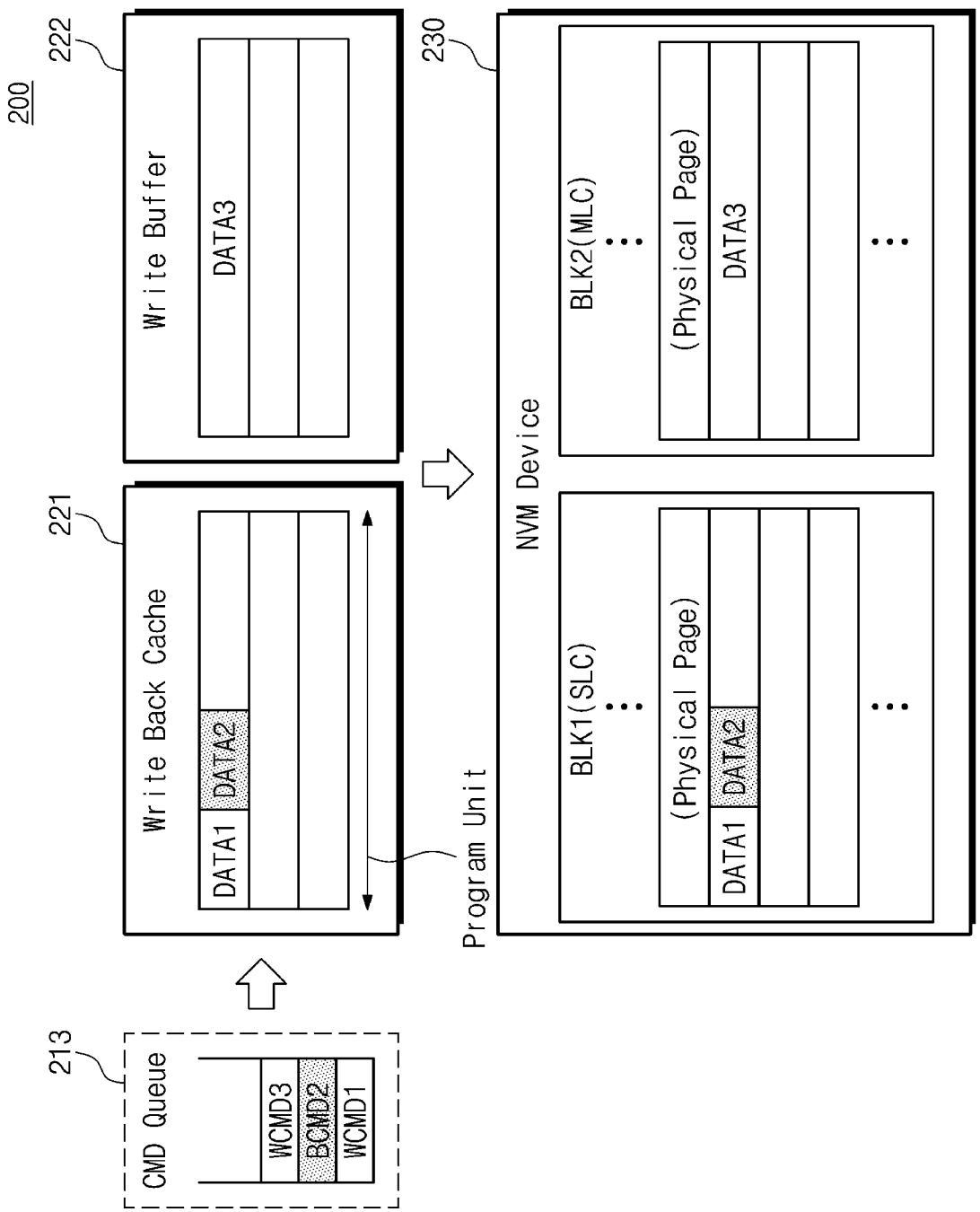
FIG. 7 illustrates a diagram of an operation in which a storage device processes a barrier command, according to another embodiment of the inventive concepts.

FIG. 7 illustrates a diagram of an operation in which a storage device processes a barrier command, according to another embodiment of the inventive concepts. FIG. 7 will be described together with reference to FIGS. 1 and 5. The assumption described with reference to FIGS. 4 and 5 may also be applied to FIG. 7, and it is assumed that the storage device 200 of FIG. 7 supports the second barrier command BCMD2 and preserves a write order.

The controller 210 may store the first data DATA1 and the second data DATA2 stored in the write back cache 221 to a first block BLK1 and then may store the third data DATA3 stored in the write buffer 222 to a second block BLK2. Although not illustrated in FIG. 7, the controller 210 may merge the first data DATA1, the second data DATA2, and the dummy data of FIG. 6 and may store the merged data to the first block BLK1.

In FIG. 7, the first data DATA1 and the second data DATA2 smaller than the program unit may be hot data which are updated relatively frequently, and the third data DATA3 corresponding to the program unit may be cold data which are not updated relatively frequently. The controller 210 may separate the first block BLK1 where hot data are stored and the second block BLK2 where cold data are stored, while preserving the write order of the second data DATA2 based on the second barrier command BCMD2. For example, each of memory cells of the first block BLK1 may be a single level cell (SLC) storing one bit, and each of memory cells of the second block BLK2 may be a multi-level cell (MLC) storing at least two bits.

Referring to FIGS. 5 to 7, the controller 210 may perform a program operation in the following order: 1) program the first data DATA1 received prior to the second data DATA2 corresponding to the second barrier command BCMD2 to the nonvolatile memory device 230, 2) program the second data DATA2 to the nonvolatile memory device 230, and 3) program the third data DATA3 received after the second data DATA2 to the nonvolatile memory device 230. Although not illustrated in FIGS. 5 to 7, the first data DATA1 may be programmed, another data may be programmed, and the second data DATA2 may be programmed. Also, the second data DATA2 may be programmed, another data may be programmed, and the third data DATA3 may be programmed. In all cases, the controller 210 may preserve the write order of the second data DATA2 regardless of whether to program another data.

Figure 8:
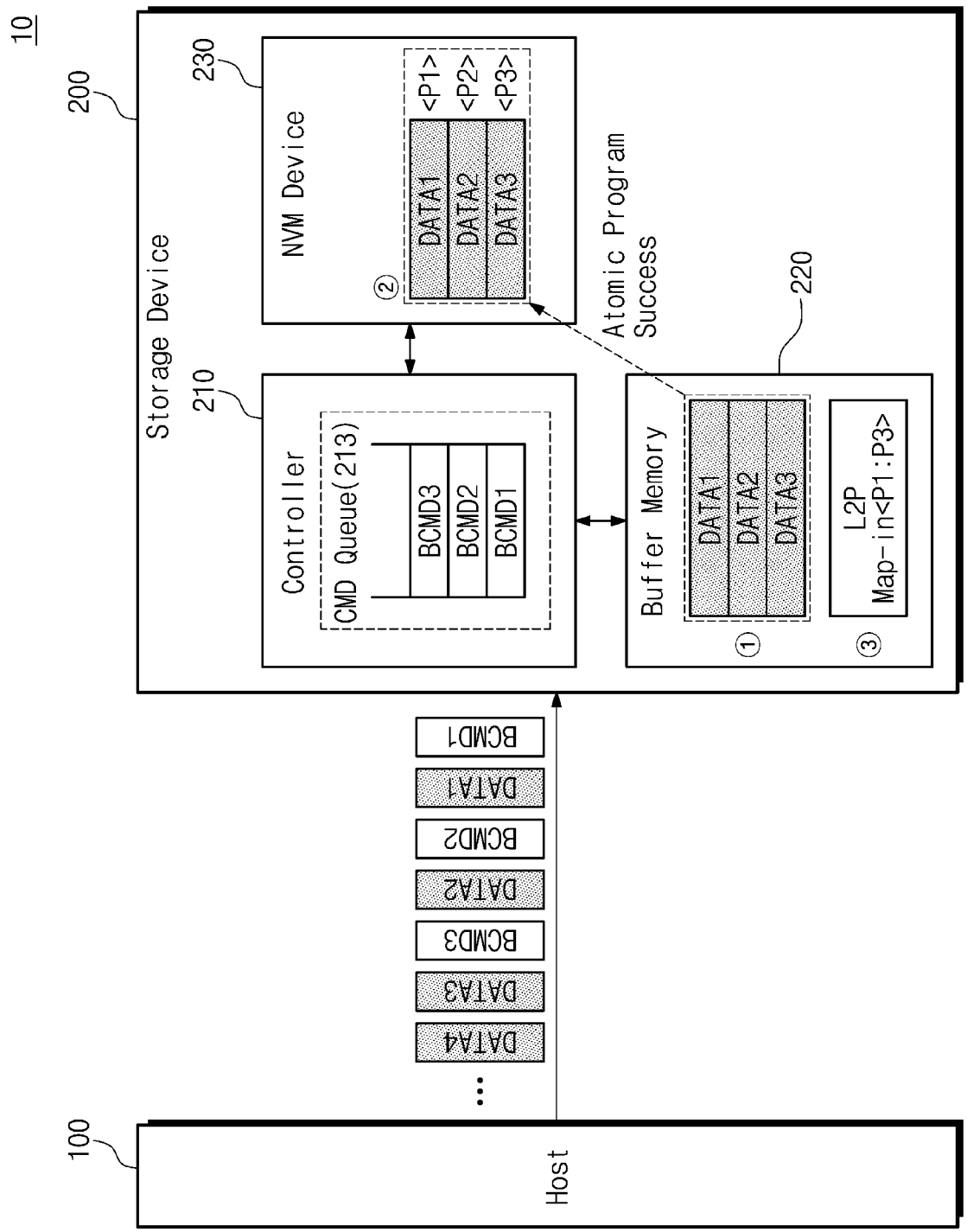
FIG. 8 illustrates a diagram of an operation in which a storage device processes received barrier commands in order and all the data is normally programmed, according to an embodiment of the inventive concepts.
Figure 9:
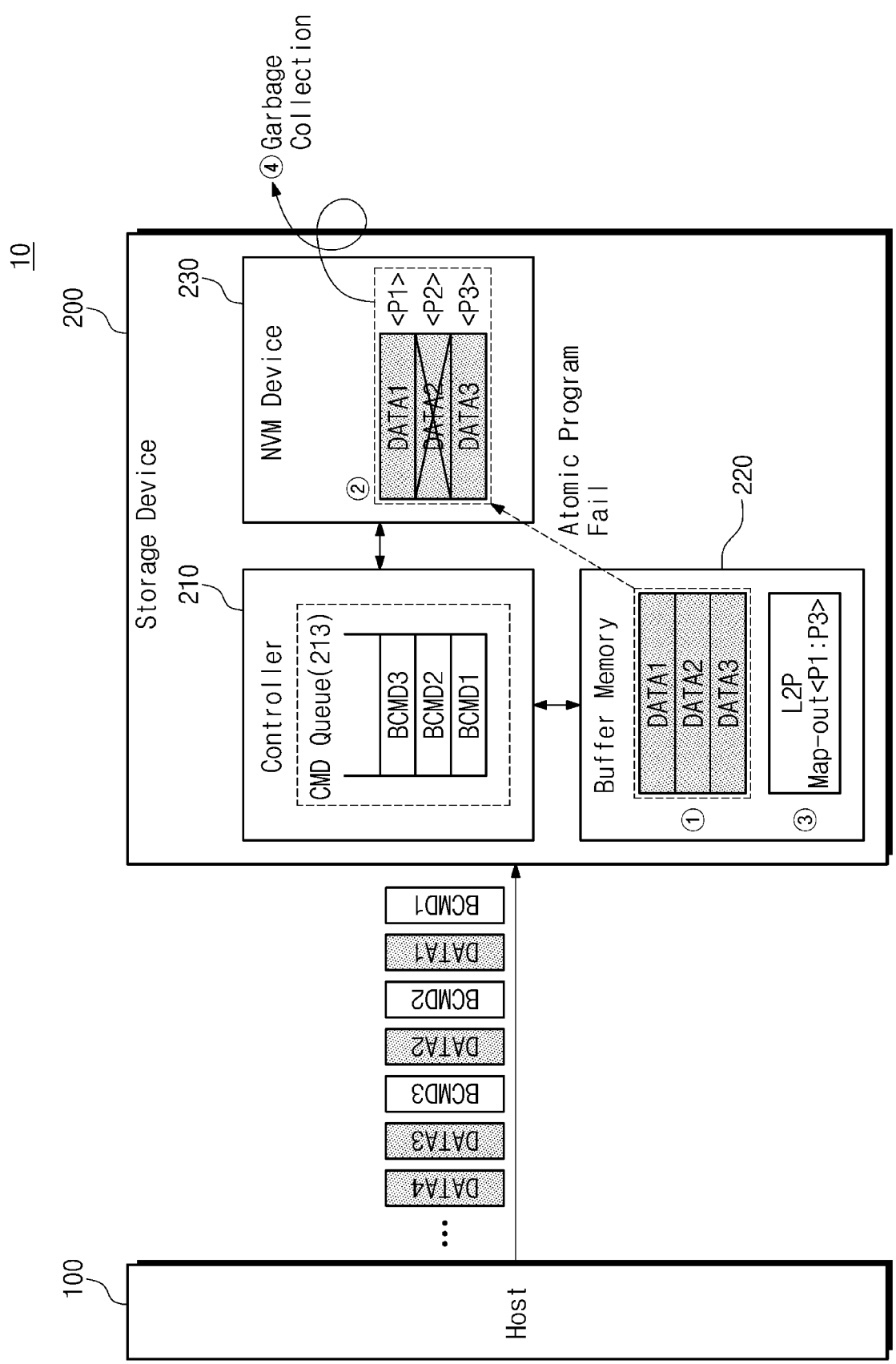
FIG. 9 illustrates a diagram of the operation in FIG. 8 in which a storage device processes received barrier commands in order and all the data is not programmed, according to an embodiment of the inventive concepts.

FIGS. 8 and 9 illustrate diagrams of an operation in which a storage device processes received barrier commands in order, according to an embodiment of the inventive concepts. FIGS. 8 and 9 will be described together, and will be described with reference to FIG. 1. In FIGS. 8 and 9, it is assumed that the size of each of the first to fourth data DATA1 to DATA4 corresponds to the program unit. In the computer system 10, the host 100 may transfer first to third barrier commands BCMD1 to BCMD3 to the storage device 200 in order and may transfer the first to third data DATA1 to DATA3 to the storage device 200 in the DMA scheme. The host 100 may transfer the first barrier command BCMD1, the first data DATA1, the second barrier command BCMD2, the second data DATA2, the third barrier command BCMD3, and the third data DATA3 in order. The first data DATA1 may be sequentially provided after receiving the first barrier command BCMD1. The second data DATA2 may be sequentially provided after receiving the second barrier command BCMD2. However, the host 100 may transfer the second barrier command BCMD2 while transferring the first data DATA1.

The controller 210 of the storage device 200 may receive the first to third barrier commands BCMD1 to BCMD3 from the host 100 in order and may insert the first to third barrier commands BCMD1 to BCMD3 into the command queue 213 in order. The controller 210 may receive the first to third data DATA1 to DATA3 respectively corresponding to the first to third barrier commands BCMD1 to BCMD3 and may store the first to third data DATA1 to DATA3 to the buffer memory 220 (①).

The controller 210 may decode the first to third barrier commands BCMD1 to BCMD3 and may sequentially program the first to third data DATA1 to DATA3 to the nonvolatile memory device 230 in order based on the order of receiving the first to third barrier commands BCMD1 to BCMD3 (②). The controller 210 may atomically perform a program operation of the first to third data DATA1 to DATA3. In the case where the controller 210 performs an atomic program operation, all the first to third data DATA1 to DATA3 may be normally programmed to the nonvolatile memory device 230 (refer to FIG. 8), or all the first to third data DATA1 to DATA3 may not be programmed to the nonvolatile memory device 230 (refer to FIG. 9). According to the atomic program operation, the case where only a part of the first to third data DATA1 to DATA3 is programmed to the nonvolatile memory device 230 does not happen. The controller 210 may program the first to third data DATA1 to DATA3 to the nonvolatile memory device 230 and may commit the program operation of the first to third data DATA1 to DATA3. Alternatively, the controller 210 may roll back without programming the first to third data DATA1 to DATA3. The controller 210 may program fourth data DATA4 to the nonvolatile memory device 230 after completing the atomic program operation for the first to third data DATA1 to DATA3. A command for the fourth data DATA4 is not illustrated in FIGS. 8 and 9.

Referring to FIG. 8, the first data DATA1 may be programmed to a first physical page <P1>, the second data DATA2 may be programmed to a second physical page <P2>, and the third data DATA3 may be programmed to a third physical page <P3> (atomic program succeeds). In this case, the controller 210 may map in or update mapping information of the first to third physical pages <P1:P3> in a mapping table L2P (③). Here, the term "map in" may mean an operation in which the controller 210 updates the mapping information of the first to third physical pages <P1:P3> in the mapping table L2P. The controller 210 may classify all the first to third data DATA1 to DATA3 as valid data through the map-in operation. The controller 210 may map in the first to third data DATA1 to DATA3.

Referring to FIG. 9, the first data DATA1 may be programmed to the first physical page <P1>; the third data DATA3 may be programmed to the third physical page <P3>, but the second data DATA2 may not be programmed to the second physical page <P2> due to an SPO or a system crash (atomic program fails). In this case, the controller 210 may map out the mapping information of the first and third physical pages <P1> and <P3> as well as the mapping information of the second physical page <P2> in the mapping table L2P (③). Here, the term "map out" may mean an operation in which the controller 210 does not update the mapping information of the first to third physical pages <P1:P3> in the mapping table L2P. The controller 210 may classify all the first to third data DATA1 to DATA3 as invalid data through the map-out operation. The controller 210 may perform garbage collection on the first to third data DATA1 to DATA3 and may erase the first to third data DATA1 to DATA3 (④).

Figure 10:
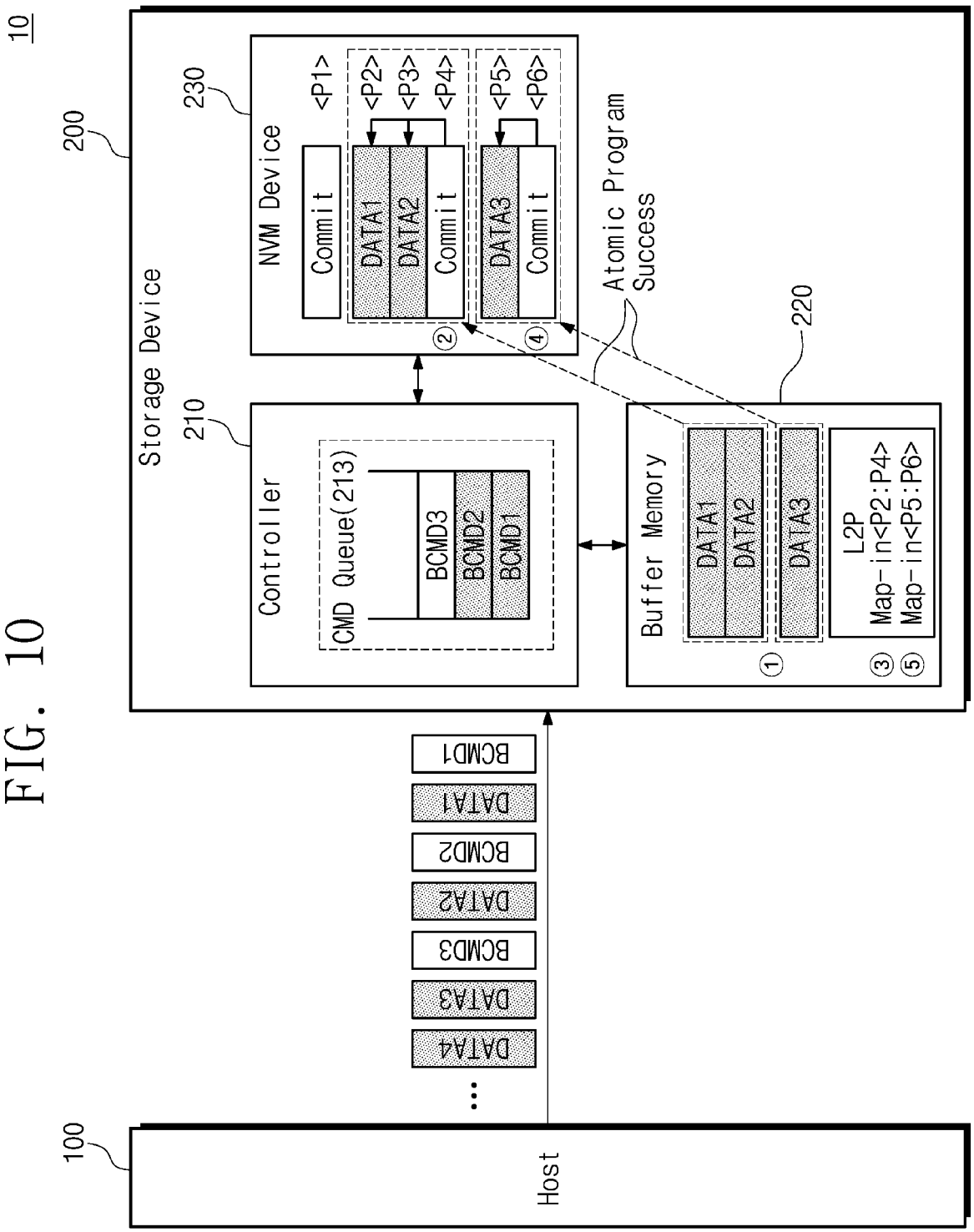
FIG. 10 illustrates a diagram of an operation in which a storage device processes received barrier commands in order and data is normally programmed, according to another embodiment of the inventive concepts.
Figure 11:
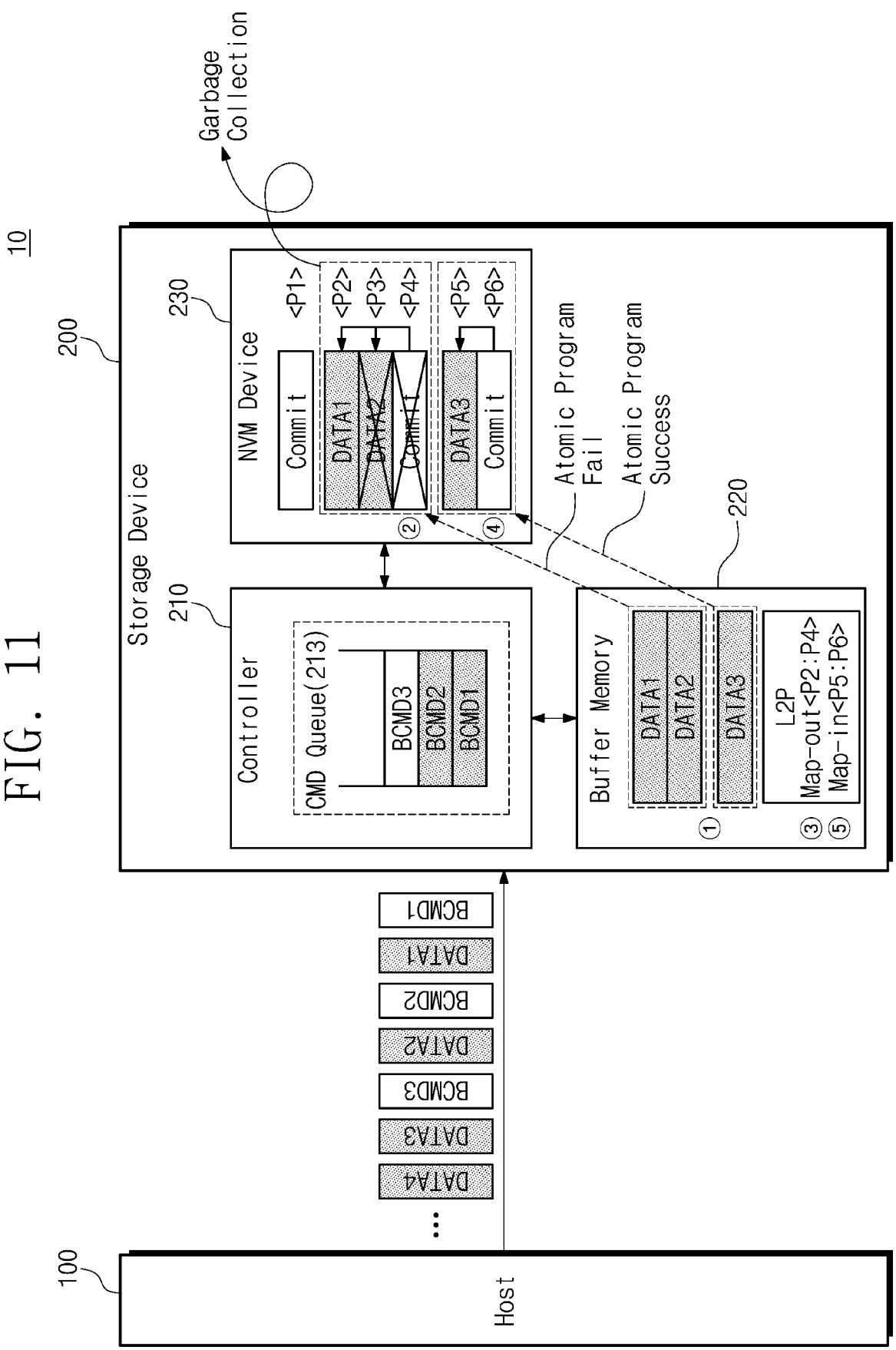
FIG. 11 illustrates a further diagram of the operation in FIG. 10 in which a storage device processes received barrier commands in order and all the data is not normally programmed, according to another embodiment of the inventive concepts.

FIGS. 10 and 11 illustrate diagrams of an operation in which a storage device processes received barrier commands in order, according to another embodiment of the inventive concepts. FIGS. 10 and 11 will be described together, and will be described with reference to FIG. 1. As in the case of FIGS. 8 and 9, the controller 210 may receive the first to third barrier commands BCMD1 to BCMD3 in order and may insert the first to third barrier commands BCMD1 to BCMD3 into the command queue 213 in order. The controller 210 may merge and process a plurality of barrier commands. For example, the controller 210 may merge the first and second barrier commands BCMD1 and BCMD2.

The controller 210 may first process the merged first and second barrier commands BCMD1 and BCMD2 and then may process the third barrier command BCMD3.

The controller 210 may receive the first to third data DATA1 to DATA3 respectively corresponding to the first to third barrier commands BCMD1 to BCMD3 and may store the first to third data DATA1 to DATA3 to the buffer memory 220 (①). The controller 210 may program the first and second data DATA1 and DATA2 to the second and third pages <P2> and <P3> of the nonvolatile memory device 230 sequentially based on the order of the first and second barrier commands BCMD1 and BCMD2. Next, the controller 210 may program a commit page to a fourth page <P4> of the nonvolatile memory device 230 for determining whether to commit a program operation of the first and second data DATA1 and DATA2 (②).

The controller 210 may determine whether to commit the program operation of the first and second data DATA1 and DATA2 by reading the commit page. The controller 210 may read or scan the commit pages of the first and fourth physical pages <P1> and <P4> and may determine whether to commit the program operation of the first and second data DATA1 and DATA2 between the commit pages. Referring to FIG. 10, the controller 210 may classify the first and second data DATA1 and DATA2 as valid data and may map in mapping information of the first and second physical pages <P1> and <P2> in the mapping table L2P (③).

In contrast, referring to FIG. 11, due to the SPO or system crash, the second data DATA2 may not be programmed to the third physical page <P3>, and a commit page may not be programmed to the fourth physical page <P4>. The controller 210 may classify the first and second data DATA1 and DATA2 as invalid data and may map out the mapping information of the first and second physical pages <P1> and <P2> in the mapping table L2P (③). Here, even in the case where the second data DATA2 are programmed to the third physical page <P3> and only the commit page is not programmed to the fourth physical page <P4>, the controller 210 may map out the mapping information of the first and second physical pages <P1> and <P2> in the mapping table L2P (③). Afterwards, the controller 210 may perform garbage collection on the first and second data DATA1 and DATA2 (④).

After mapping in or mapping out the mapping information of the first and second physical pages <P1> and <P2> in the mapping table L2P, the controller 210 may program the third data DATA3 to a fifth physical page <P5>. Next, the controller 210 may program a commit page to a sixth physical page <P6> for determining whether to commit a program operation of the third data DATA3 (④). The controller 210 may read or scan commit pages and may determine whether to commit the program operation of the third data DATA3 between the commit pages.

Referring to FIG. 10, the controller 210 may classify the third data DATA3 programmed to the fifth physical page <P5> between the fourth and sixth physical pages <P4> and <P6> as valid data and may map in the mapping information of the fifth physical page <P5> in the mapping table L2P (⑤). Referring to FIG. 11, the controller 210 may classify the third data DATA3 programmed to the fifth physical page <P5> between the first and sixth physical pages <P1> and <P6> as valid data and may map in the mapping information of the fifth physical page <P5> in the mapping table L2P (⑤). For example, referring to FIG. 11, a time when garbage collection is performed on the first and second data DATA1 and DATA2 may be after a time (⑤) at which the third data DATA3 are programmed.

Figure 12:
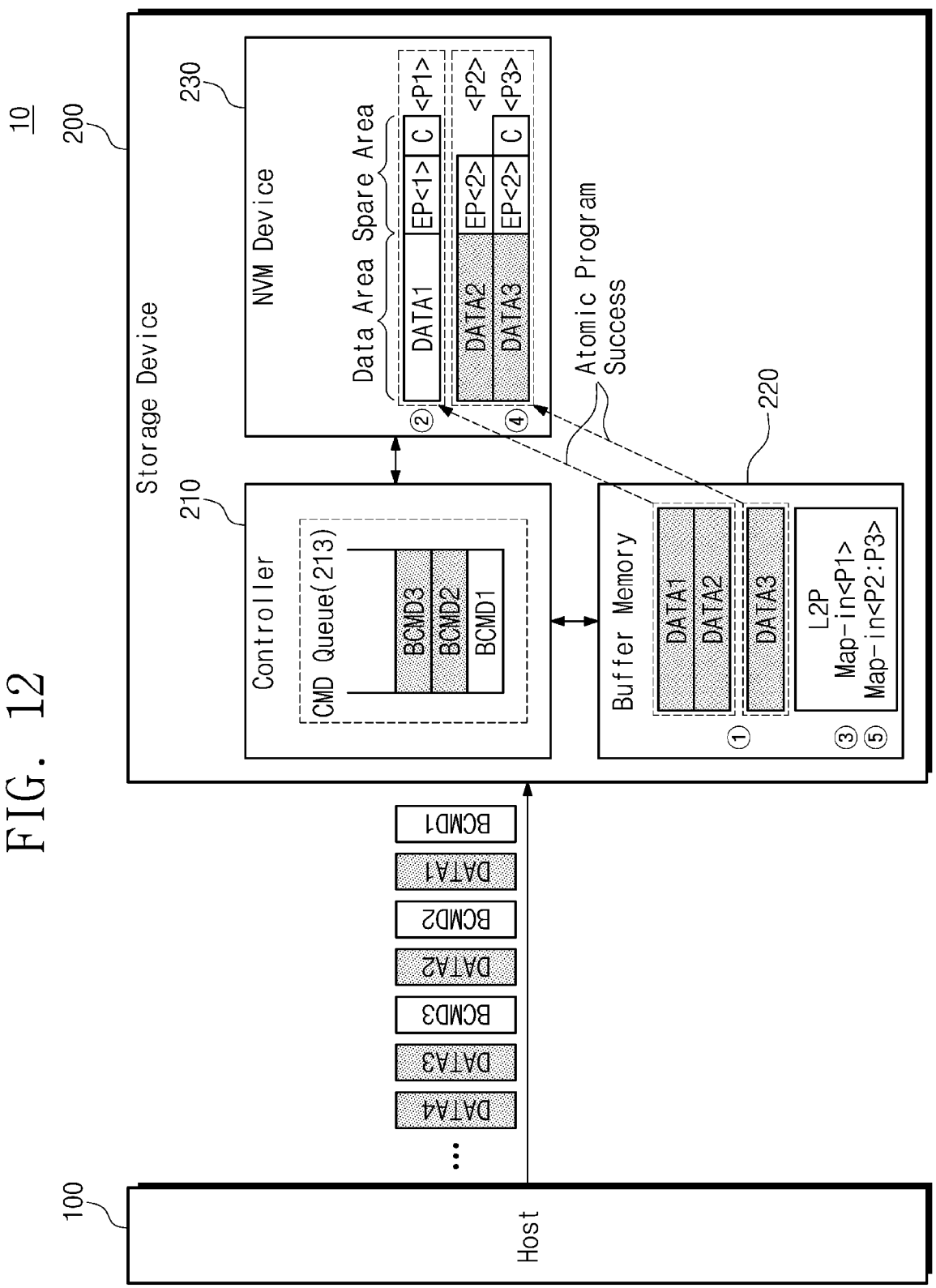
FIG. 12 illustrates a diagram of an operation in which a storage device processes received barrier commands in order, according to another embodiment of the inventive concepts.

FIG. 12 illustrates a diagram of an operation in which a storage device processes received barrier commands in order, according to another embodiment of the inventive concepts. FIG. 12 will be described with reference to FIG. 1. In FIG. 12, it is assumed that atomic program operations of data are all successful.

As in the case of FIGS. 8 to 11, the controller 210 may receive the first to third barrier commands BCMD1 to BCMD3 in order and may insert the first to third barrier commands BCMD1 to BCMD3 into the command queue 213 in order. For example, the controller 210 may merge the second and third barrier commands BCMD2 and BCMD3. The controller 210 may first process the first barrier command BCMD1, and may then process the merged second and third barrier commands BCMD2 and BCMD3. The controller 210 may receive the first to third data DATA1 to DATA3 respectively corresponding to the first to third barrier commands BCMD1 to BCMD3 and may store the first to third data DATA1 to DATA3 to the buffer memory 220 (①).

Unlike the case of FIGS. 8 to 11, the controller 210 may program the data to the nonvolatile memory device 230 together with flag information instead of programming only data to the nonvolatile memory device 230. The flag information may mark a barrier command indicating a write order of data.

An epoch of data may be determined depending on the barrier command of the host 100. An epoch number indicates an epoch of data and is used to distinguish first programmed data from later programmed data with respect to the barrier command. An epoch number of data may be included in the flag information of the data by the controller 210. The controller 210 may assign the same epoch number to a set of data corresponding to merged barrier commands Referring to FIG. 12, the controller 210 may assign a first epoch number EP<1> to the first data DATA1 and may assign a second epoch number EP<2> to the second and third data DATA2 and DATA3. A commit record bit "C" may be included in the flag information of data by the controller 210. As in the commit page, the commit record bit "C" may be used to determine whether to commit a program operation of data.

The controller 210 may program the first data DATA1, the first epoch number EP<1>, and the commit record bit "C" to a first physical page <P1> of the nonvolatile memory device 230 (②). The controller 210 may program the first data DATA1 in a data area of the first physical page <P1> and the first epoch number EP<1> and the commit record bit "C" in a spare area of the first physical page <P1>. However, different than as shown in FIG. 12, in other embodiments the first epoch number EP<1> and the commit record bit "C" may be stored to a different page or a different block of the nonvolatile memory device 230.

The controller 210 may read the commit record bit "C" of the first physical page <P1> and may determine whether to commit the program operation of the first data DATA1. The controller 210 may classify the first data DATA1 as valid data and may map in the mapping information of the first physical page <P1> in the mapping table L2P (③).

As in the first data DATA1, the controller 210 may program the second data DATA2 and the second epoch number EP<2> to a second physical page <P2> and the third data DATA3, the second epoch number EP<2>, and the commit record bit "C" to a third physical page <P3> (④). The controller 210 may read the commit record bit "C" of the third physical page <P3> and may determine whether to commit the program operation of the second and third data DATA2 and DATA3. The controller 210 may classify the second and third data DATA2 and DATA3 as valid data and may map in mapping information of the second and third physical pages <P2> and <P3> in the mapping table L2P (⑤).

In embodiments of the inventive concepts, the controller 210 may program the commit record bit "C" together with finally programmed data (referring to FIG. 12, the third data DATA3) of a set of data corresponding to the merged commands and having the same epoch number. The commit record bit "C" may not be included in flag information of the remaining data of the set of data having the same epoch number other than the finally programmed data, by the controller 210. In other embodiments, the controller 210 may rearrange a write order in the set of data corresponding to the merged commands and having the same epoch number. For example, the controller 210 may program the third data DATA3 to the second physical page <P2> and the second data DATA2 and the commit record bit "C" to the third physical page <P3>.

Figure 13:
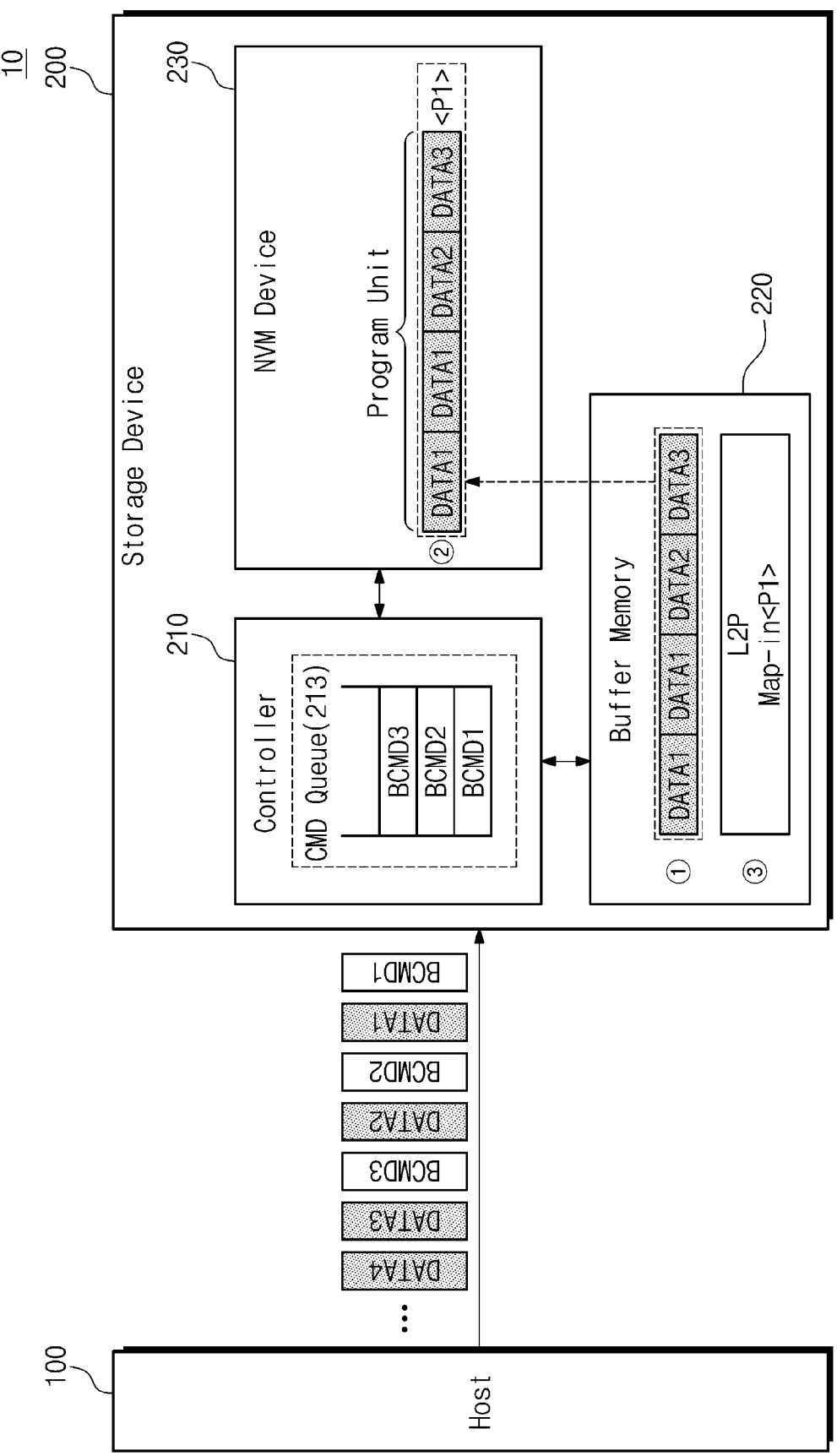
FIG. 13 illustrates a diagram of an operation in which a storage device processes received barrier commands in order, according to another embodiment of the inventive concepts.

FIG. 13 illustrates a diagram of an operation in which a storage device processes received barrier commands in order, according to another embodiment of the inventive concepts. FIG. 13 will be described with reference to FIG. 1. In FIG. 13, it is assumed that atomic program operations of data are all successful and the size of each of the first to third data DATA1 to DATA3 is smaller than the program unit.

As in the case of FIGS. 8 to 12, the controller 210 may receive the first to third barrier commands BCMD1 to BCMD3 in order and may insert the first to third barrier commands BCMD1 to BCMD3 into the command queue 213 in order. For example, the controller 210 may merge the first to third barrier commands BCMD1 to BCMD3. For example, the controller 210 may merge barrier commands based on the size of barrier data. The size of the set of data corresponding to the merged barrier commands may be the program unit.

The controller 210 may receive the first to third data DATA1 to DATA3 respectively corresponding to the first to third barrier commands BCMD1 to BCMD3 and may store the first to third data DATA1 to DATA3 to the buffer memory 220 (①). For example, the first data DATA1 may be 8 KB, the second data DATA2 may be 4 KB, the third data DATA3 may be 4 KB, and the size of the set of the merged data may be 16 KB and may be the program unit.

The controller 210 may program the first to third data DATA1 to DATA3 to a first physical page <P1> of the nonvolatile memory device 230 (②). Although not illustrated in FIG. 13, the controller 210 may program flag information (i.e., an epoch number and a commit record bit of FIG. 12) of the first to third data DATA1 to DATA3 in a spare area of the first physical page <P1>. In other embodiments of the inventive concepts, positions of the first to third data DATA1 to DATA3 may be rearranged by the controller 210 without limitation, and may be different than as shown in FIG. 13. The controller 210 may classify the first to third data DATA1 to DATA3 as valid data and may map in the mapping information of the first physical page <P1> in the mapping table L2P (③).

Figure 14:
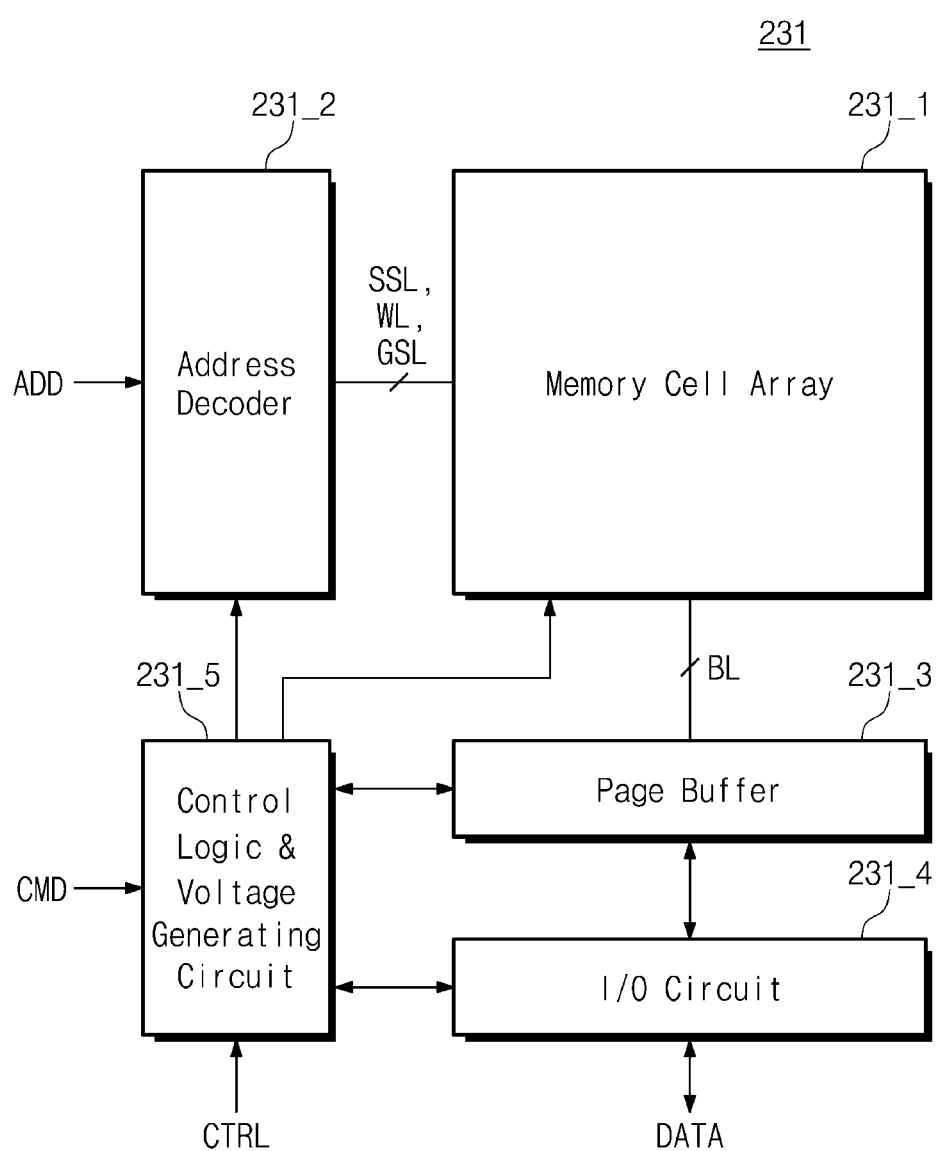
FIG. 14 illustrates a block diagram of a nonvolatile memory in the nonvolatile memory device of FIG. 1.

FIG. 14 illustrates a block diagram of one of nonvolatile memories in a nonvolatile memory device of FIG. 1. A nonvolatile memory 231 includes a memory cell array 231_1, an address decoder 231_2, a page buffer 231_3, an input/output (I/O) circuit 231_4, and a control logic and voltage generating circuit 231_5. The nonvolatile memory 231 may also be referred to as a "nonvolatile memory chip".

The memory cell array 231_1 may include a plurality of memory blocks. Each of the memory blocks may include a plurality of cell strings. Each of the cell strings may include memory cells. The memory cells may be connected with word lines WL. Each memory cell may include a single level cell (SLC) storing one bit or a multi-level cell (MLC) storing at least two bits.

In an embodiment, the memory cell array 231_1 may include a three-dimensional memory array. The three-dimensional (3D) memory array may be monolithically formed in one or more physical level(s) of a memory cell array having an active area arranged on a circuit on a silicon substrate, the circuit being related to an operation of memory cells. The circuit associated with an operation of memory cells may be located in a substrate or on the substrate. The term "monolithic" means that layers of each level of the 3D memory array are directly deposited on the layers of each underlying level of the array. The 3D memory array includes vertical NAND strings that are vertically oriented such that at least one memory cell is located over another memory cell. The at least one memory cell may comprise a charge trap layer. Each vertical NAND string may include at least one selection transistor located over memory cells. At least one selection transistor may have the same structure as memory cells, and be monolithically formed together with memory cells. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The address decoder 231_2 is connected with the memory cell array 231_1 through the word lines WL, string selection lines SSL, and ground selection lines GSL. The address decoder 231_2 may receive and decode a physical address ADD from the controller 210 and may drive the word lines WL based on the decoding result. For example, the address decoder 231_2 may select at least one of the word lines WL.

The page buffer 231_3 is connected with the memory cell array 231_1 through bit lines BL. Under control of the control logic and voltage generating circuit 231_5, the page buffer 231_3 may drive the bit lines BL such that data "DATA" received by the page from the input/output circuit 231_4 are stored to the memory cell array 231_1. Alternatively, under control of the control logic and voltage generating circuit 231_5, the page buffer 231_3 may read data stored in the memory cell array 231_1 by the page and may provide the read data to the input/output circuit 231_4.

The input/output circuit 231_4 may receive the data "DATA" from the controller 210 and may provide the data "DATA" to the page buffer 231_3. Alternatively, the input/output circuit 231_4 may receive the data "DATA" from the page buffer 231_3 and may provide the data "DATA" to the controller 210. The input/output circuit 231_4 may exchange data with an external device based on a control signal CTRL.

The control logic and voltage generating circuit 231_5 may control the address decoder 231_2, the page buffer 231_3, and the input/output circuit 231_4 in response to a storage command CMD and the control signal CTRL received from the controller 210. For example, the control logic and voltage generating circuit 231_5 may control other components in response to the signals CMD and CTRL such that the data "DATA" are stored to the memory cell array 231_1. Alternatively, the control logic and voltage generating circuit 231_5 may control other components in response to the signals CMD and CTRL such that data "DATA" stored in the memory cell array 231_1 are transferred to the external device. The control logic and voltage generating circuit 231_5 may generate various voltages needed for the nonvolatile memory 231 to operate. The control logic and voltage generating circuit 231_5 may for example generate program voltages, pass voltages, selection read voltages, non-selection read voltages, erase voltages, and verification voltages. The control logic and voltage generating circuit 231_5 may provide the generated voltages to the address decoder 231_2 or to a substrate of the memory cell array 231_1.

Figure 15:
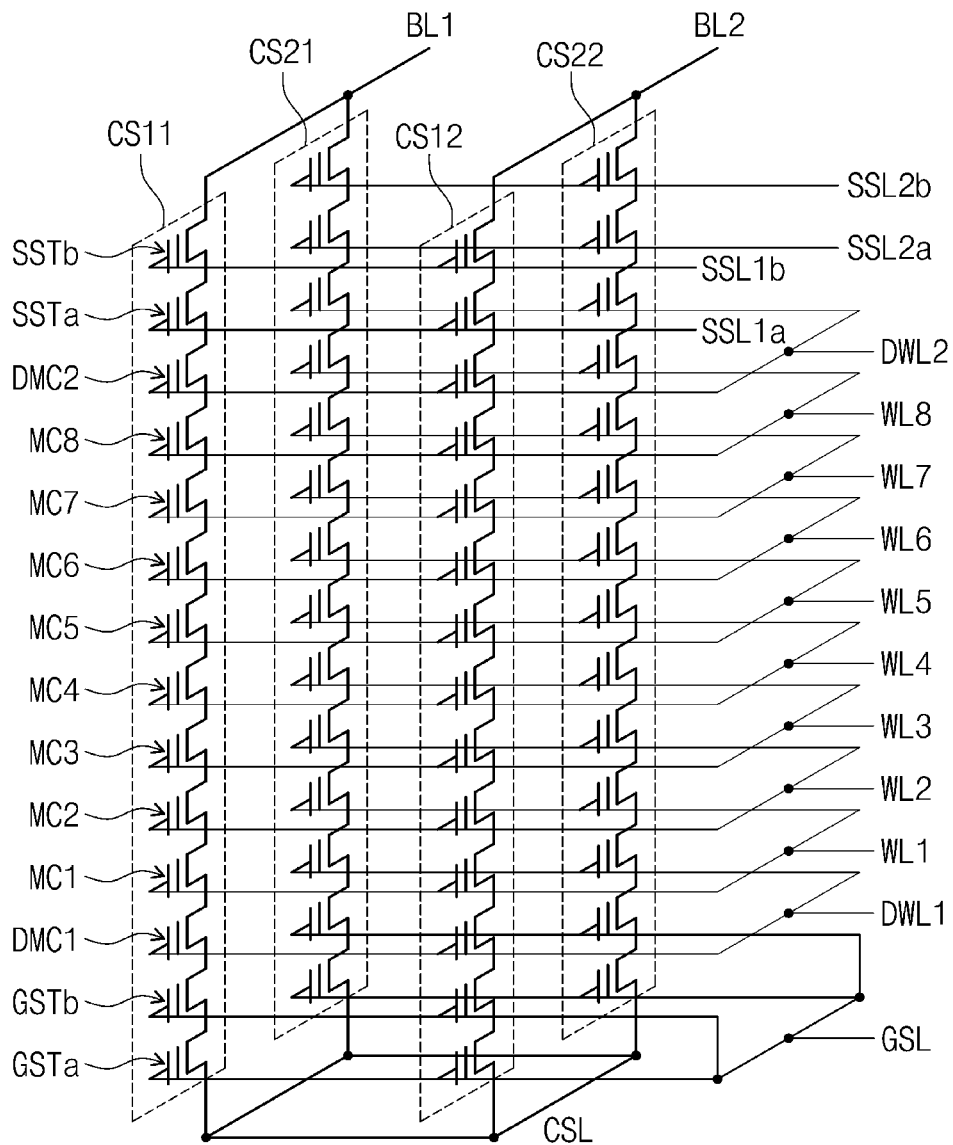
FIG. 15 illustrates a circuit diagram of a first block of three-dimensional memory blocks included in a memory cell array of FIG. 14.

FIG. 15 illustrates a circuit diagram of a first block of three-dimensional memory blocks included in a memory cell array of FIG. 14. In a first block BLK1, the number of cell strings, the number of rows and columns composed of the cell strings, the number of cell transistors GST, MC, DMC, SST, etc., the number of lines GSL, WL, DML, SSL, etc. connected with the cell transistors, and a height of the first block BLK1 are not limited as shown in FIG. 15. The remaining memory blocks included in the nonvolatile memory device 230 may also have a structure which is similar to the structure of the first block BLK1.

The first block BLK1 may include cell strings CS11 to CS22. The cell strings CS11 to CS22 may be arranged along a row direction and a column direction. The cell strings CS11 and CS12 may be connected with string selection lines SSL1a and SSL1b (a first row). The cell strings CS21 and CS22 may be connected with string selection lines SSL2a and SSL2b (a second row). The cell strings CS11 and CS21 may be connected with a first bit line BL1 (a first column) The cell strings CS12 and CS22 may be connected with a second bit line BL2 (a second column).

Each of the cell strings CS11 to CS22 may include cell transistors. Each of the cell strings CS11 to CS22 may include string selection transistors SSTa and SSTb, memory cells MC1 to MC8, ground selection transistors GSTa and GSTb, and dummy memory cells DMC1 and DMC2. Each of the memory cells MC1 to MC8 may be a charge trap flash (CTF) memory cell.

The memory cells MC1 to MC8 may be serially connected and may be stacked in a height direction being a direction perpendicular to a plane defined by the row direction and the column direction. In each cell string, the string selection transistors SSTa and SSTb may be serially connected to each other and may be arranged between the memory cells MC1 to MC8 and a bit line BL. In each cell string, the ground selection transistors GSTa and GSTb may be serially connected to each other and may be arranged between the memory cells MC1 to MC8 and a common source line CSL. In each cell string, the first dummy memory cell DMC1 may be provided between the memory cells MC1 to MC8 and the ground selection transistors GSTa and GSTb. In each cell string, the second dummy memory cell DMC2 may be provided between the memory cells MC1 to MC8 and the string selection transistors SSTa and SSTb. The ground selection transistors GSTa and GSTb of the cell strings CS11 to CS22 may be connected in common to a ground selection line GSL.

The first ground selection transistors GSTa of the cell strings CS11 and CS12 in the first row may be connected to a first ground selection line, and the first ground selection transistors GSTa of the cell strings CS21 and CS22 in the second row may be connected to a second ground selection line. Ground selection transistors provided at the same height from a substrate (not illustrated) may be connected to the same ground selection line, and ground selection transistors provided at different heights may be connected to different ground selection lines. For example, the first ground selection transistors GSTa of the cell strings CS11 to CS22 may be connected to the first ground selection line, and the second ground selection transistors GSTb thereof may be connected to the second ground selection line.

Memory cells of the same height from the substrate (or the ground selection transistors GSTa and GSTb) are connected in common to the same word line, and memory cells of different heights therefrom are connected to different word lines. The first to eighth memory cells MC1 to MC8 in cell strings CS11 to CS22 may be connected respectively in common to first to eighth word lines WL1 to WL8. String selection transistors, which belong to the same row, from among the first string selection transistors SSTa at the same height may be connected to the same string selection line, and string selection transistors, which belong to different rows, from among the first string selection transistors SSTa at the same height may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a. Also, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

String selection transistors of cell strings in the same row may be connected in common to a string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line. Dummy memory cells of the same height may be connected with the same dummy word line, and dummy memory cells of different heights may be connected with different dummy word lines. For example, the first dummy memory cells DMC1 may be connected with a first dummy word line DWL1, and the second dummy memory cells DMC2 may be connected with a second dummy word line DWL2.

In the first block BLK1, read and write operations may be performed by the row. For example, one row in the first block BLK1 may be selected by the string selection lines SSL1a, SSL1b, SSL2a, and SSL2b. The cell strings CS11 and CS12 in the first row may be connected to bit lines BL1 and BL2 when the turn-on voltage is supplied to the string selection lines SSL1a and SSL1b and the turn-off voltage is supplied to the string selection lines SSL2a and SSL2b. In the opposite case, the cell strings CS21 and CS22 in the second row may be connected to the bit lines BL1 and BL2. As a word line is driven, memory cells, which belong to the same height, from among memory cells of cell strings in a selected row are selected. The selected memory cells may correspond to a physical page unit. A read or write operation may be performed on the selected memory cells.

Figure 16:
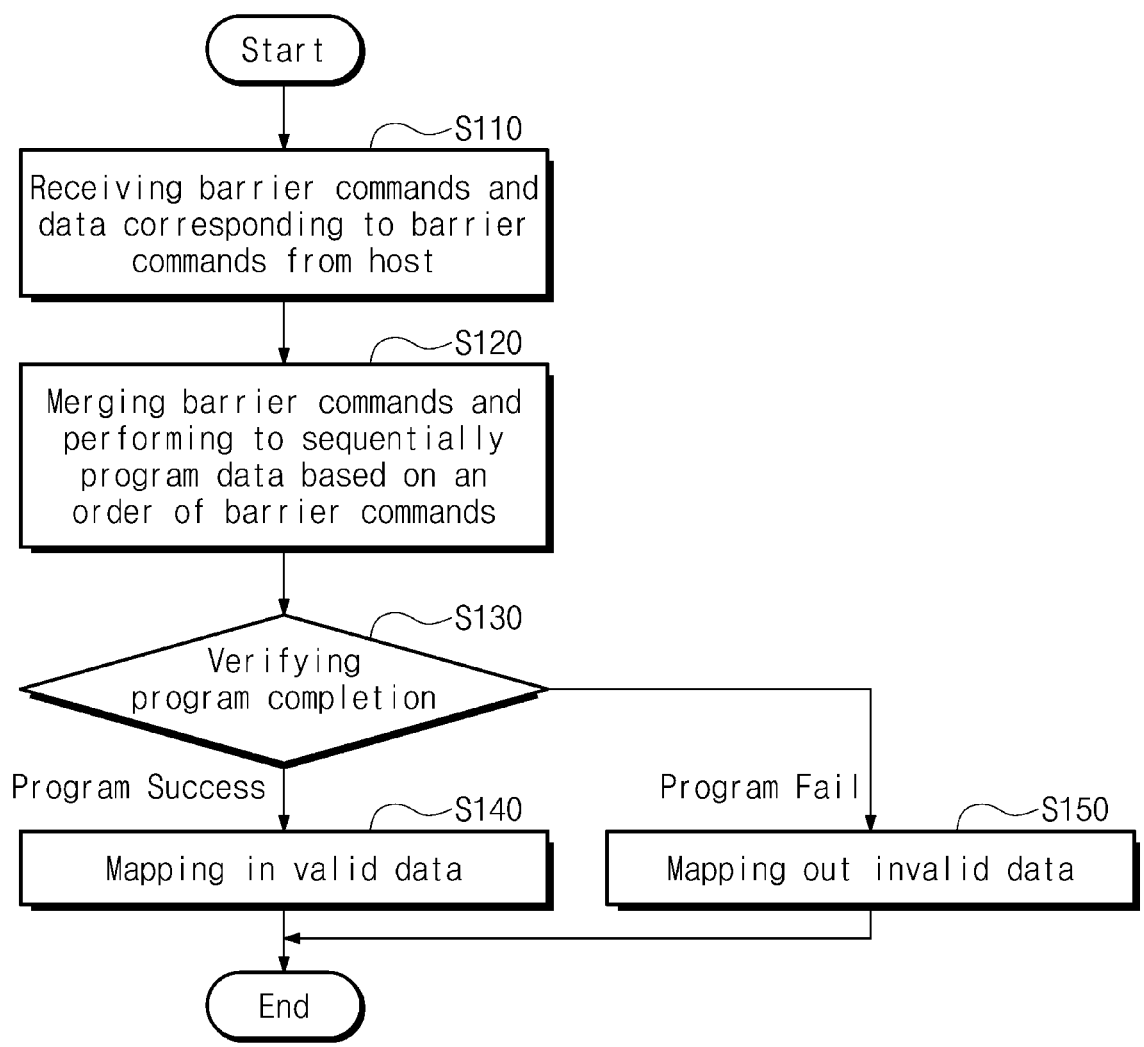
FIG. 16 illustrates a flowchart of an operating method of a storage device of FIG. 1.

FIG. 16 illustrates a flowchart of an operating method of a storage device of FIG. 1. In operation S110, the controller 210 of the storage device 200 receives barrier commands and data (or a set of data) respectively corresponding to the barrier commands. As described above, the data may be transferred from the host 100 in the DMA scheme.

In operation S120, the controller 210 merges the barrier commands and programs the data sequentially to the nonvolatile memory device 230 based on an order of the barrier commands or in accordance with the order of the barrier commands. The controller 210 may merge barrier commands based on the program unit of the nonvolatile memory device 230 which is determined depending on the number of physical pages to be simultaneously accessed depending on the number of bits to be stored to a memory cell, the size of one physical page, a multi-channel, a multi-way, and a multi-plane. An embodiment is illustrated in FIGS. 8 to 13 as data are stored in any one physical page. However, the data may be distributed and stored to a plurality of chips, a plurality of planes, a plurality of blocks, or a plurality of pages in the nonvolatile memory device 230. Programming of operation S120 may be atomically performed.

In operation S130, the controller 210 verifies program completion of operation S120. The controller 210 may read commit pages of FIGS. 10 and 11 or may read a commit record bit of FIG. 12. The controller 210 determines data to which a commit page or a commit record bit is assigned as valid data, and determines data to which a commit page or a commit record bit is not assigned as invalid data.

In the case where the programming succeeds (Program Success in S130), in operation S140 the controller 210 maps in mapping information of physical pages where valid data are programmed in the mapping table L2P. In the case where the programming fails (Program Fail in S130), in operation S150 the controller 210 maps out mapping information of physical pages where invalid data are programmed in the mapping table L2P. In the case where a part of data targeted for the atomic program operation is distributed and stored to a plurality of chips, a plurality of planes, a plurality of blocks, or a plurality of pages in the nonvolatile memory device 230 and the rest of the data is not stored, the controller 210 maps out mapping information of physical pages where the part of the data are stored. In an embodiment of the inventive concepts, after mapping out or mapping in data corresponding to a barrier command or after completely programming data, the controller 210 may program different data corresponding to a different barrier command to the nonvolatile memory device 230.

Figure 17:
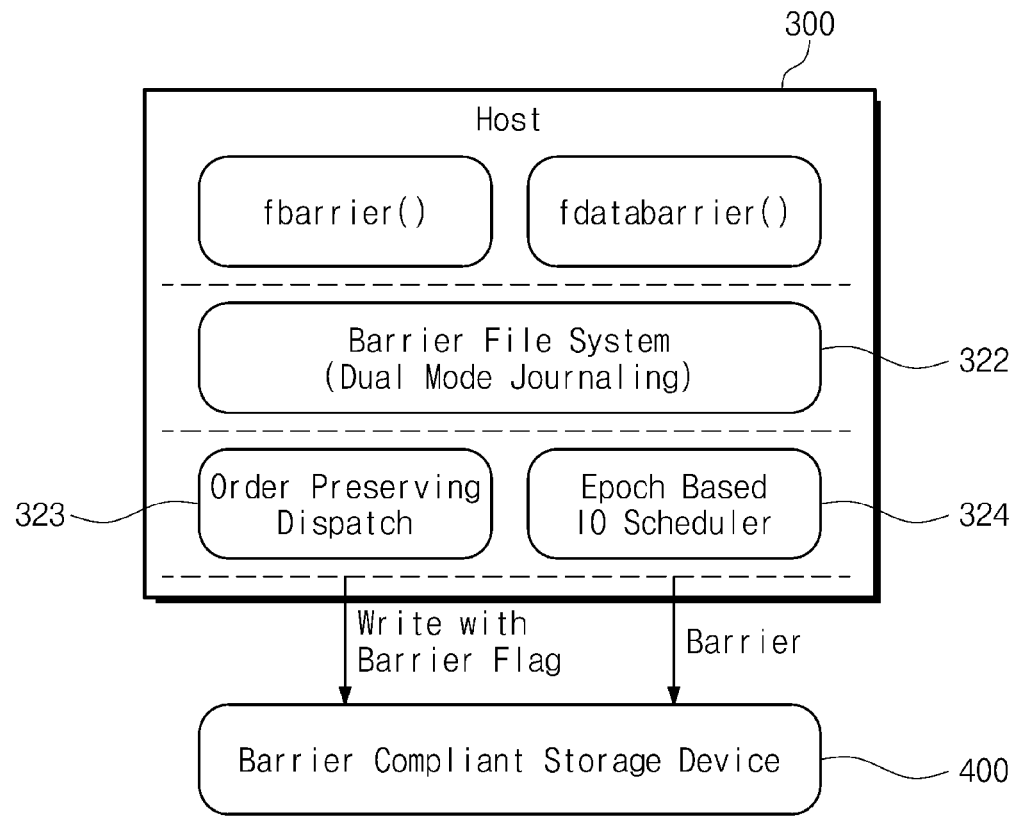
FIG. 17 illustrates a diagram of a software stack of a host supporting a system call for a write order, according to an embodiment of the inventive concepts.
Figure 18:
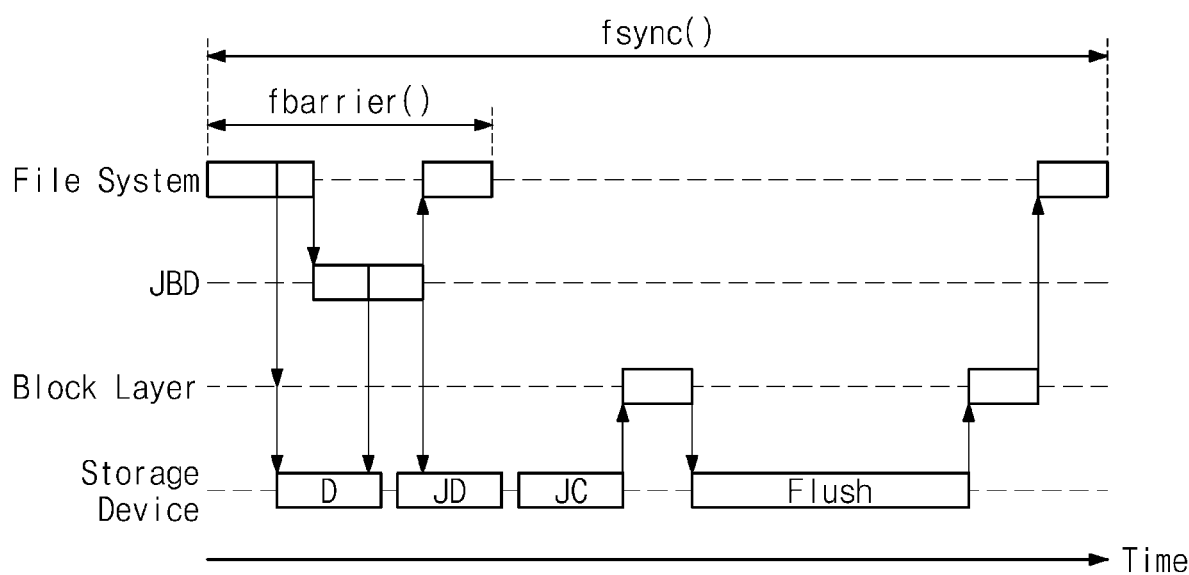
FIG. 18 illustrates a timing diagram of an operation in which a host of FIG. 17 performs journaling on a storage device.

FIG. 17 illustrates a diagram of a software stack of a host supporting a system call for a write order, according to an embodiment of the inventive concepts. FIG. 18 illustrates a timing diagram of an operation in which a host of FIG. 17 performs journaling on a storage device. FIGS. 17 and 18 will be described together with reference to FIGS. 1 and 2. A storage device (i.e., barrier compliant storage device) 400 may be the storage device 200 of FIG. 1 supporting a barrier command.

A host 300 of FIG. 17 may include the components of the host 100 of FIG. 1. In terms of hardware, the host 300 may be implemented to be substantially the same as the host 100 of FIG. 1. A plurality of software loaded onto the host memory 120 of FIG. 1 may also be executed in the host 300 of FIG. 17. However, unlike the host 100, the host 300 may support a system call such as fbarrier( ) or fdatabarrier( ). A barrier file system (dual mode journaling) 322, a dispatcher (i.e., order preserving dispatch) 323, and an input/output (I/O) scheduler (i.e., epoch based scheduler) 324 may be loaded onto a host memory (refer to the host memory 120 of FIG. 1) of the host 300.

An operation of the barrier file system 322 may be similar to the operation of the file system 122. In an embodiment of the inventive concepts, in the case where fsync( ) or fdatasync( ) is called, the barrier file system 322 may determine whether fsync( ) or fdatasync( ) is called to write data in order, by using hint information. The barrier file system 322 may determine whether an extension of a file is a word determined in advance, whether a file name is a word determined in advance, or whether a name of a process calling fsync( ) or fdatasync( ) is a word determined in advance. The hint information may include the extension of the file determined in advance, the file name determined in advance, or the name of the process calling fsync( ) or fdatasync( ).

In another embodiment of the inventive concepts, in the case where fbarrier( ) or fdatabarrier( ) is called, the barrier file system 322 may determine that fbarrier( ) or fdatabarrier( ) is called to write data in order. fbarrier( ) is similar to fdatabarrier( ). File metadata may be modified by fbarrier( ). However, when fbarrier( ) is called, in the case where file metadata for reading newly written data are not additionally modified, the file metadata may not be modified. The barrier file system 322 may assign a commit thread to dispatch write requests and a flush thread to flush data corresponding to the write requests to the storage device 400, to the host memory. The barrier file system 322 may generate the commit thread and the flush thread to perform dual mode journaling.

Referring to FIG. 18, the barrier file system 322 may perform journaling. When backing up the journal or after modifying a database file, fbarrier( ) or fdatabarrier( ) may be called. In the case where fbarrier( ) begins, the barrier file system 322 may insert (or enqueue) write requests into a scheduler queue (not illustrated) (refer to the scheduler queue 124 of FIG. 1) of a block layer for transferring file data "D" to the storage device 400. The write requests may be dispatched to the storage device 400. Unlike the file system 122, the barrier file system 322 may trigger the commit thread without waiting until a DMA transfer of the file data "D" is completed.

The commit thread may insert write requests into the scheduler queue for transferring journal data JD and the journal commit JC to the storage device 400. The write requests may be dispatched to the storage device 400. The commit thread may wait until the DMA transfer of the journal data JD and the DMA transfer of the journal commit JC are completed. The commit thread may trigger the flush thread in the case where the DMA transfer of the journal data JD and the DMA transfer of the journal commit JC are completed. The flush thread may insert flush requests into the scheduler queue so that the journal data JD and the journal commit JC are flushed. The flush requests may be dispatched to the storage device 400. In the case where the journal data JD and the journal commit JC are completely flushed, fbarrier( ) may be returned.

Referring to FIG. 18, in the case where fsync( ) is called, the file system 122 of FIG. 1 has to wait until the DMA transfer of the file data "D", the DMA transfer and flush of the journal data JD, and the DMA transfer and flush of the journal commit JC are all completed. In contrast, in the case where fbarrier( ) is called as in FIG. 18, the barrier file system 322 may insert IO requests to the scheduler queue without waiting until the DMA transfer and flush of the file data "D", the journal data JD, and the journal commit JC are completed.

Returning to FIG. 17 again, the dispatcher 323 of the block layer may dispatch the IO requests input to the scheduler queue to a command queue (refer to the command queue 213 of FIGS. 3 to 13) of the storage device 400. For example, the dispatcher 323 may dispatch a barrier command to the command queue. The dispatcher 323 may guarantee the following sequence: 1) existing commands of the command queue are processed, 2) the barrier command is processed, and 3) commands after the barrier command are processed. The dispatcher 323 may allow an order in which commands are dispatched to the storage device 400 from the host 300 to coincide with an order in which commands are processed at the command queue of the storage device 400. The dispatcher 323 may be referred to as an "order-preserving dispatcher".

In an embodiment, the barrier command dispatched from the dispatcher 323 may be a write command having a barrier flag. In another embodiment, the barrier command dispatched from the dispatcher 323 may be generated from an input request which is independent of a write request and occupies one entry of the scheduler queue.

On the basis of an epoch, the input/output scheduler 324 may allow an order in which IO requests are inserted into the scheduler queue to coincide with an order in which commands are dispatched from the host 300 to the storage device 400. The input/output scheduler 324 may preserve an order between epochs. The input/output scheduler 324 may determine whether an IO request inserted into the scheduler queue is a barrier write request. In the case where the inserted IO request is the barrier write request, the input/output scheduler 324 may receive the IO requests no longer. Accordingly, all IO requests which are input to the scheduler queue before the barrier write request and are present in the scheduler queue after the barrier write request may belong to one epoch. The input/output scheduler 324 may rearrange or merge the IO request belonging to the epoch. The input/output scheduler 324 may send the IO request existing in the scheduler queue to a device driver (refer to the device driver 125 of FIG. 1). The input/output scheduler 324 may designate a finally output IO request as a new barrier write request. In the case where all IO requests existing in the scheduler queue are dequeued or are sent, the input/output scheduler 324 may receive new IO requests.

Figure 19:
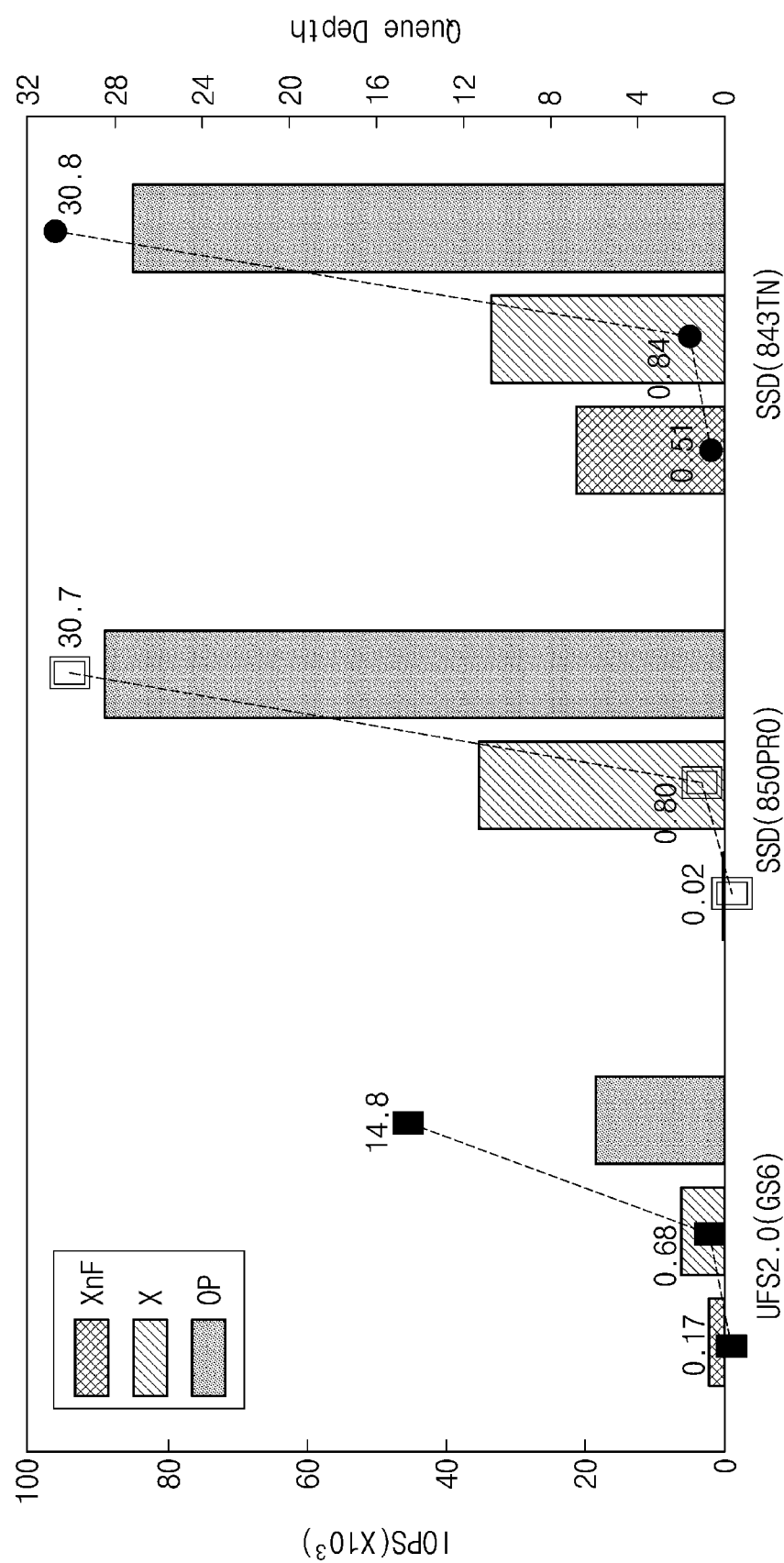
FIG. 19 illustrates a diagram of an IOPS and a command queue depth of a storage device according to an embodiment of the inventive concepts.

FIG. 19 illustrates a diagram of an IOPS and a command queue depth of a storage device according to an embodiment of the inventive concepts. A storage device according to an embodiment of the inventive concepts may include the storage devices 200 or 400 described with reference to FIGS. 1 to 18. In FIG. 19, "XnF" represents a transfer-and-flush scheme (refer to FIG. 2), "X" represents a wait-on-transfer scheme, and "OP" represents an order-preserving scheme according to an embodiment of the inventive concepts (refer to FIG. 18). In the case where each of UFS 2.0(GS6) which corresponds to an implementation of universal flash storage 2.0 in a Samsung Galaxy 6, SSD(850 PRO) which corresponds to a Samsung SSD 850 Pro, and SSD(843TN) which corresponds to a Samsung SSD 843TN, each available from Samsung Electronics Co., Ltd., processes IO requests in the XnF scheme, the "X" scheme, and the OP scheme, input/output operations per second (IOPS) and a command queue depth are illustrated in FIG. 19. In the case of the OP scheme according to an embodiment of the inventive concepts, the host 100/300 may transfer commands according to IO requests to the storage device 100/200 without waiting until the DMA transfer of data and a flush of the data are completed. Accordingly, the IOPS and queue depth of the storage device 100/200 may increase through the OP scheme compared with the XnF scheme or the "X" scheme.

According to embodiments of the inventive concepts, a storage device may support a barrier command for preserving a write order. A host which communicates with the storage device may provide write requests to the storage device in order without waiting until each of the write requests generated in order is completed by the storage device.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method of programming data to a storage device including a nonvolatile memory device, the method comprising:
   receiving a first barrier command, a second barrier command, and a third barrier command from a host;
   receiving first data corresponding to the first barrier command, second data corresponding to the second barrier command, and third data corresponding to the third barrier command from the host;
   merging the first and second barrier commands and programming the first and second data to the nonvolatile memory device sequentially based on an order of the first and second barrier commands;
   verifying program completion of both the first and second data;
   mapping in the first and second data when programming of the first and second data is completed, or mapping out both the first and second data when programming of at least one of the first and second data is not completed; and
   programming the third data to the nonvolatile memory device after the mapping in or the mapping out,
   wherein flag information corresponding to each of the first to third barrier commands is programmed in a spare area of the nonvolatile memory device, the flag information comprises an epoch number, the merged first and second barrier commands have same epoch numbers, and a commit record bit is additionally written in the epoch number of the second barrier command.

2. The method of claim 1, wherein each of the first to third barrier commands includes a program command.

3. The method of claim 1, wherein whether the programming of both the first and second data is completed is determined with reference to the commit record bit.

4. The method of claim 1, wherein the first data are sequentially provided from the host after the first barrier command is received.

5. The method of claim 1, wherein the second data following the second barrier command are provided from the host after the second barrier command is received.

6. The method of claim 1, wherein the third data is programmed after determination by said verifying of whether the programming of both the first and second data is completed.

7. The method of claim 6, wherein the first and second data are programmed to a first block of the nonvolatile memory device, and the third data are programmed to a second block of the nonvolatile memory device.

8. The method of claim 1, wherein the mapping in comprises classifying the first and second data as valid data.

9. The method of claim 1, wherein the mapping out comprises classifying the first and second data as invalid data.

10. The method of claim 9, further comprising:
    performing garbage collection on the first and second data classified as the invalid data.

11. The method of claim 1, wherein an amount of the first and second data is identical to or smaller than a program unit of the nonvolatile memory device.

12. The method of claim 1, further comprising programming, by the storage device, the first and second data to the nonvolatile memory device together with fourth data when an amount of the first and second data is smaller than a program unit of the nonvolatile memory device.

13. An operating method of a memory controller that controls a nonvolatile memory device, the operating method comprising:
 receiving, by the memory controller, a first barrier command and a first program command, a second barrier command and a second program command, and a third barrier command and a third program command from a host;
 receiving, by the memory controller, first data corresponding to the first barrier command, second data corresponding to the second barrier command, and third data corresponding to the third barrier command from the host;
 merging, by the memory controller, the first to third barrier commands and programming the first to third data sequentially to the nonvolatile memory device;
 verifying, by the memory controller, whether the first to third data are programmed; and
 classifying the first to third data as valid data when all the first to third data are programmed, or classifying the first to third data as invalid data when at least one of the first to third data are not programmed,
 wherein program completion of the first to third data is determined with reference to a commit record bit programmed in a spare area of the nonvolatile memory device, and
 wherein flag information corresponding to each of the first to third barrier commands is programmed in the spare area of the nonvolatile memory device, the flag information comprises an epoch number, the merged first, second and third barrier commands have same epoch numbers, and the commit record bit is additionally written in the epoch number of the third barrier command.

14. The operating method of claim 13, wherein a sum of sizes of the first to third data is identical to or smaller than a program unit of the nonvolatile memory device.

15. A computer system comprising:
 a host; and
 a storage device configured to receive from the host first, second, and third barrier commands and first, second, and third data to be programmed which respectively correspond to the first, second and third barrier commands,
 wherein the storage device comprises
 a plurality of nonvolatile memory devices configured to store the first, second and third data, and
 a memory controller configured to
 control the plurality of nonvolatile memory devices,
 merge the first, second and third barrier commands,
 sequentially program the first, second and third data,
 determine whether programming of the first, second and third data is completed,
 map in the first, second, and third data as valid data when the programming of all the first, second and third data is completed, and
 map out the first, second, and third data as invalid data when the programming of at least one of the first, second, and third data is not completed,
 wherein the first, second and third data are selectively programmed in the plurality of nonvolatile memory devices with flag information including epoch numbers and commit record bits,
 the flag information is programmed in spare area of the nonvolatile memory devices, and
 the merged first, second and third barrier commands have same epoch numbers, and the commit record bit is additionally written in the epoch number of the third barrier command.

16. The computer system of claim 15, wherein the host is configured, when providing the first, second and third barrier commands to the storage device, to not flush the first, second and third data respectively corresponding to the first, second and third barrier commands.

* * * * *